(12) United States Patent
Ha

(10) Patent No.: US 9,948,478 B2
(45) Date of Patent: Apr. 17, 2018

(54) ONLINE SYSTEM AND METHOD FOR USING THE SAME

(75) Inventor: Mikyung Ha, Changwon-si (KR)

(73) Assignee: LG Electronics Inc., Seoul (KR)

( * ) Notice: Subject to any disclaimer, the term of this patent is extended or adjusted under 35 U.S.C. 154(b) by 494 days.

(21) Appl. No.: 14/238,694

(22) PCT Filed: Aug. 2, 2012

(86) PCT No.: PCT/KR2012/006165
§ 371 (c)(1),
(2), (4) Date: Feb. 12, 2014

(87) PCT Pub. No.: WO2013/027939
PCT Pub. Date: Feb. 28, 2013

(65) Prior Publication Data
US 2014/0197934 A1    Jul. 17, 2014

(30) Foreign Application Priority Data
Aug. 22, 2011    (KR) .................. 10-2011-0083698

(51) Int. Cl.
*H04L 12/28*    (2006.01)
*H04L 12/12*    (2006.01)
(Continued)

(52) U.S. Cl.
CPC .......... *H04L 12/2818* (2013.01); *D06F 33/02* (2013.01); *D06F 39/005* (2013.01);
(Continued)

(58) Field of Classification Search
CPC ... H04L 12/2818; H04L 43/065; H04L 12/12; D06F 39/005
(Continued)

(56) References Cited

U.S. PATENT DOCUMENTS 3,398,460 A    8/1968    Elders
6,121,593 A    9/2000    Mansbery
(Continued)

FOREIGN PATENT DOCUMENTS

CN    1343806 A    4/2002
CN    1359214      7/2002
(Continued)

OTHER PUBLICATIONS

Thomas Ricker, "LG Thinq linqs your smart appliances with WiFi and smart apps", Jan. 4, 2011, pp. 1-9 ,LG_thinQ.pdf>.
(Continued)

*Primary Examiner* — Thomas Alunkal
(74) *Attorney, Agent, or Firm* — KED & Associates, LLP

(57) ABSTRACT

The present invention relates to a home appliance which can communicate with an outside of the home appliance, an online system and a method for using the online system including the same. According to embodiments of the present invention, a method for using an online system may be provided including the steps of log in a server by transmitting user information to the server through an external terminal, selecting a laundry machine of which course updating is desired through the external terminal and transmitting the same to the server, receiving updatable course information from the server, and displaying the information on the external terminal, selecting an updating desired course through the external terminal, and transmitting selected course information to the server, and updating the laundry machine with the selected course through the server.

22 Claims, 13 Drawing Sheets

(51) Int. Cl.
 *D06F 39/00* (2006.01)
 *D06F 33/02* (2006.01)
 *A47L 15/00* (2006.01)
(52) U.S. Cl.
 CPC ........... *H04L 12/12* (2013.01); *A47L 15/0063* (2013.01); *Y02B 60/34* (2013.01)
(58) Field of Classification Search
 USPC ....................................... 340/12.29; 345/173
 See application file for complete search history.

(56) References Cited

U.S. PATENT DOCUMENTS

| | | | |
|---|---|---|---|
| 7,196,623 B1 | 3/2007 | Wang | |
| 7,363,031 B1 | 4/2008 | Aisa | |
| 7,464,426 B2 | 12/2008 | Lee et al. | |
| 7,526,539 B1 | 4/2009 | Hsu | |
| 7,603,119 B1 | 10/2009 | Durig | |
| 7,693,546 B1 | 4/2010 | Gioscia | |
| 7,742,951 B2 * | 6/2010 | Ebrom | D06F 33/02 434/365 |
| 8,866,634 B2 | 10/2014 | Williamson | |
| 2002/0032491 A1 | 3/2002 | Imamura | |
| 2002/0065770 A1 | 5/2002 | Ebata | |
| 2002/0075160 A1 | 6/2002 | Racz | |
| 2002/0095483 A1 * | 7/2002 | Lee | D06F 33/02 709/219 |
| 2002/0180579 A1 | 12/2002 | Nsgaoka | |
| 2003/0051040 A1 | 3/2003 | Tanikawa et al. | |
| 2003/0171113 A1 | 9/2003 | Choi | |
| 2003/0178894 A1 | 9/2003 | Ghent | |
| 2004/0158620 A1 | 8/2004 | Ha et al. | |
| 2004/0249961 A1 | 12/2004 | Katsube | |
| 2005/0033647 A1 * | 2/2005 | Crisp, III | B67D 1/0057 705/16 |
| 2005/0050647 A1 | 3/2005 | Tanaka | |
| 2005/0088276 A1 | 4/2005 | Lee et al. | |
| 2005/0096788 A1 | 5/2005 | Peterson | |
| 2005/0108326 A1 | 5/2005 | Tuttle | |
| 2005/0162273 A1 | 7/2005 | Yoon | |
| 2005/0201393 A1 | 9/2005 | Hatayama | |
| 2006/0208066 A1 | 9/2006 | Finn | |
| 2006/0239208 A1 | 10/2006 | Roberts | |
| 2007/0053513 A1 | 3/2007 | Hoffberg | |
| 2007/0118862 A1 * | 5/2007 | Jeong | D06F 29/00 725/80 |
| 2007/0279248 A1 | 12/2007 | Matsumoto | |
| 2008/0042868 A1 | 2/2008 | Lee et al. | |
| 2008/0113683 A1 | 5/2008 | Paas | |
| 2008/0132179 A1 | 6/2008 | Takeshita | |
| 2008/0136581 A1 | 6/2008 | Heilman | |
| 2008/0224834 A1 | 9/2008 | Oosaka et al. | |
| 2009/0006970 A1 | 1/2009 | Jeffery et al. | |
| 2009/0007346 A1 | 1/2009 | Ha | |
| 2009/0090137 A1 * | 4/2009 | Jeong | D06F 33/02 68/12.02 |
| 2009/0138107 A1 | 5/2009 | Ha | |
| 2009/0170532 A1 | 7/2009 | Lee | |
| 2009/0195349 A1 | 8/2009 | Frader-Thompson | |
| 2009/0195404 A1 | 8/2009 | Combs, Jr. | |
| 2009/0217335 A1 | 8/2009 | Wong | |
| 2010/0095716 A1 | 4/2010 | Bae | |
| 2010/0115788 A1 | 5/2010 | Kim | |
| 2010/0165879 A1 | 7/2010 | Gupta et al. | |
| 2010/0185537 A1 | 7/2010 | Bari | |
| 2010/0217837 A1 | 8/2010 | Ansari | |
| 2010/0296441 A1 | 11/2010 | Barkan | |
| 2011/0007901 A1 | 1/2011 | Ikeda | |
| 2011/0012738 A1 | 1/2011 | Nakamura | |
| 2011/0082933 A1 | 4/2011 | Zhou | |
| 2011/0103264 A1 | 5/2011 | Wentink | |
| 2011/0137430 A1 | 6/2011 | Kohanek | |
| 2011/0153110 A1 | 6/2011 | Drake | |
| 2011/0215919 A1 | 9/2011 | Hernandez | |
| 2011/0256850 A1 | 10/2011 | Selander | |
| 2011/0312278 A1 | 12/2011 | Matsushita | |
| 2012/0019674 A1 | 1/2012 | Ohnishi | |
| 2012/0056827 A1 * | 3/2012 | Kim | D06F 33/02 345/173 |
| 2012/0110747 A1 | 5/2012 | Yum | |
| 2012/0154108 A1 | 6/2012 | Sugaya | |
| 2012/0296489 A1 | 11/2012 | Lee | |
| 2012/0316984 A1 | 12/2012 | Glassman | |
| 2013/0006400 A1 | 1/2013 | Caceres | |
| 2013/0042416 A1 | 2/2013 | Balinski | |
| 2013/0106613 A1 | 5/2013 | Lee | |
| 2013/0135116 A1 | 5/2013 | Garbe | |
| 2013/0185079 A1 | 7/2013 | Park | |
| 2013/0254310 A1 | 9/2013 | Krywaniuk | |
| 2013/0268134 A1 | 10/2013 | Tuller | |
| 2013/0346300 A1 | 12/2013 | Kang | |
| 2015/0323915 A1 | 11/2015 | Warren | |

FOREIGN PATENT DOCUMENTS

| | | |
|---|---|---|
| CN | 1452352 | 10/2003 |
| CN | 1499162 | 5/2004 |
| CN | 1598770 A | 3/2005 |
| CN | 1606282 | 4/2005 |
| CN | 1625134 | 6/2005 |
| CN | 1625134 A | 6/2005 |
| CN | 1714191 A | 12/2005 |
| CN | 1770714 A | 5/2006 |
| CN | 1893529 | 1/2007 |
| CN | 1921528 A | 2/2007 |
| CN | 101022341 | 8/2007 |
| CN | 101167305 A | 4/2008 |
| CN | 201588102 | 9/2010 |
| CN | 101873343 | 10/2010 |
| CN | 201770893 U | 3/2011 |
| CN | 102043404 | 5/2011 |
| CN | 102043404 A | 5/2011 |
| CN | 102409508 | 4/2012 |
| CN | 103718505 A | 4/2014 |
| DE | 10 2010 063 083 A1 | 6/2012 |
| EP | 1 217 475 | 6/2002 |
| EP | 1 233 602 A1 | 8/2002 |
| EP | 1 402 101 A1 | 3/2004 |
| EP | 1 779 762 A1 | 5/2007 |
| EP | 1 852 543 A1 | 11/2007 |
| EP | 2 611 079 A1 | 7/2013 |
| EP | 2 662 482 A2 | 11/2013 |
| EP | 2 662 485 A2 | 11/2013 |
| EP | 2737659 A2 | 6/2014 |
| EP | 2737660 A2 | 6/2014 |
| JP | 2003-071178 | 3/2003 |
| JP | 2003-209892 A | 7/2003 |
| JP | 2003-225491 A | 8/2003 |
| JP | 2004-350930 A | 12/2004 |
| JP | 2005-034186 | 2/2005 |
| JP | 2005-110967 | 4/2005 |
| JP | 2005-185460 A | 7/2005 |
| JP | 2006-314806 A | 11/2006 |
| KR | 10-2003-0045238 | 6/2003 |
| KR | 10-2003-0054234 A | 7/2003 |
| KR | 10-2003-0064722 A | 8/2003 |
| KR | 10-2004-0045657 A | 6/2004 |
| KR | 10-2004-0069530 A | 8/2004 |
| KR | 10-2005-0078542 A | 8/2005 |
| KR | 100634798 | 10/2006 |
| KR | 10-2008-0024307 A | 3/2008 |
| KR | 1020090041687 | 4/2009 |
| KR | 10-2009-0095351 | 9/2009 |
| KR | 10-2011-0131655 | 12/2011 |
| KR | 10-2012-0023497 A | 3/2012 |
| TW | M391242 U1 | 10/2010 |
| WO | WO 03/004753 A1 | 1/2003 |
| WO | WO 2006/106393 A2 | 10/2006 |
| WO | WO 2010/131817 | 11/2010 |

(56) References Cited

FOREIGN PATENT DOCUMENTS

| WO | WO 2012/093897 A2 | 7/2012 |
|---|---|---|
| WO | WO 2013/015655 | 1/2013 |

OTHER PUBLICATIONS

Sorcinelli, Don, "Rethinking Device Convergence—The Video Experience," Dec. 6, 2011 (accessed from https://web.archive.org/web/20111206143144/http://www.bostonpocketpc.com/CategoryView.category,Editorial.aspx on Aug. 31, 2015.
Steele, Billy, "Samsung WiFi Washer and Dryer hands-on (video)," Jan. 10, 2012 (accessed from http://www.engadget.com/2012/01/10/samsung-smarthome-wifi-washer-and-dryer-hands-on-video/ on Jan. 14, 2014.
International Search Report issued in Application No. PCT/KR2012/006034 dated Jan. 24, 2013.
International Search Report issued in Application No. PCT/KR2012/006032 dated Jan. 25, 2013.
Korean Notice of Allowance dated May 16, 2013 issued in Application No. 10-2011-0074770 (with English translation).
European Search Report dated Nov. 21, 2013 issued in Application No. 13 18 3129.
European Search Report dated Jan. 28, 2014 issued in Application No. 13 183 127.3.
Philips: "Philips DS8800W/37 User Manual"; Jan. 1, 2011; pp. 1-26; Retrieved from the Internet on Feb. 12, 2015: URL:http://download.p4c.philips.com/files/d/ds8800w_37/ds8800w37_dfu_aen.pdf; (XP-002735886).
European Search Report dated Dec. 12, 2014 issued in Application No. 12 817 390.3.
Philips: "Philips DS9800W Registreerige oma toode 1-10 ja saage abi veebilehelt"; Jul. 8, 2011;pp. 1-16; Retrieved from the Internet on Feb. 13, 2015: URL:http://download.p4c.philips.com/_files/d/ds9800w_10/ds9800w_10 dfu_est.pdf; (XP-002735931).
European Search Report dated Mar. 4, 2015 issued in Application No. 12817976.9.
U.S. Office Action dated Feb. 2, 2016 issued in Application No. 14/017,517.
Chinese Office Action dated Feb. 22, 2016 issued in Application No. 200680014710.3 (with English translation).
Chinese Office Action dated Apr. 1, 2016 issued in Application No. 201310403718.0 (with English translation).
U.S. Office Action dated Jun. 9, 2016 issued in U.S. Appl. No. 14/017,517.
"Samsung rolls out smart appliances at CES 2012 (smart fridge, Android powered washer and dryer)", YouTube video, uploaded Jan. 14, 2012, https://www.youtube.com/watch?v=ZAhiHY5KtXk.
"Smart Appliances Steal the Show at CES 2012", Jan. 21, 2012, https://plassappliance.worldpress.com/2012/01/21/smart-appliances-steal-the-show-at-ces-2012/.
Samsung, "WF457ARG Washing Machine User Manual," Mar. 9, 2012 (accessed from http://www.homedepot.com/catalog/pdfimages/8d/8de09998-0044-4gbb2-b56b-80daela939f5.pdf, on Jan. 11, 2016.
HowardForums.com: Samsung Washer/Dryer that can be controlled with phone, howardchui, YouTube, Feb. 24, 2012 (accessed from https://www.youtube.com/watch?v=NTGnbYuXtzs on Jan. 15, 2016.
European Notice of Opposition dated Jan. 15, 2016 issued in Application No. 13183129.9 (with English translation).
European Notice of Opposition dated Jan. 18, 2016 issued in Application No. 13183129.9 (with English translation).
Chinese Office Action dated Jan. 27, 2016 issued in Application No. 201280037644.7 (English Translation Attached).
U.S. Office Action dated Jan. 29, 2016 issued in U.S. Appl. No. 14/018,090.
Australian Notice of Acceptance for Application 2013224716 dated Mar. 23, 2016 (Advertised Apr. 21, 2016).
Chinese Office Action for Application 201310403925.6 dated May 5, 2016 (full Chinese text and full English-language translation).
Chinese Office Action for Application 2012-80037644 dated Sep. 12, 2016 (full Chinese text and English language translation).
U.S. Office Action dated Oct. 27, 2016 issued in U.S. Appl. No. 14/018,090.
U.S. Office Action dated Nov. 4, 2016 issued in U.S. Appl. No. 14/017,517.
Chinese Office Action issued in Application 201280037644.7 dated Dec. 21, 2016 (full Chinese Text and full English translation).
Chinese Patent Certificate dated Apr. 12, 2017 issued in Application No. 201310403718.0.
Korean Notice of Allowance issued in Application 10-2012-0098946 dated Aug. 13, 2017 (English translation only).

* cited by examiner

[Fig. 1]
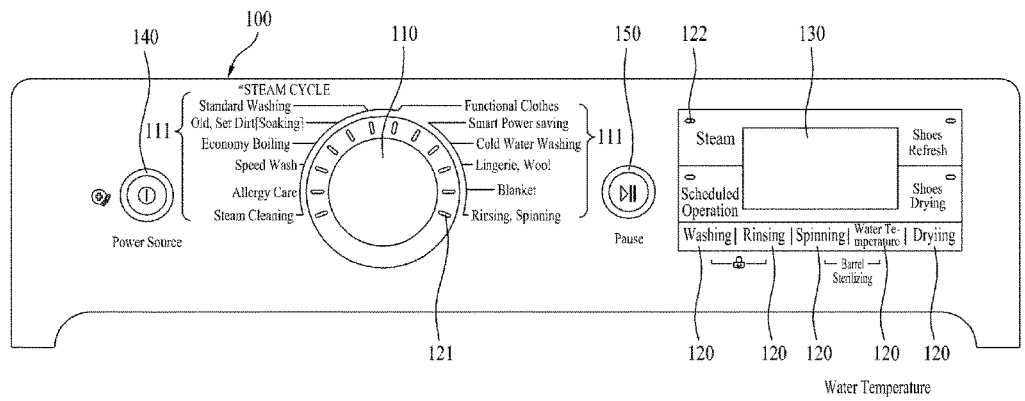
[Fig. 2]
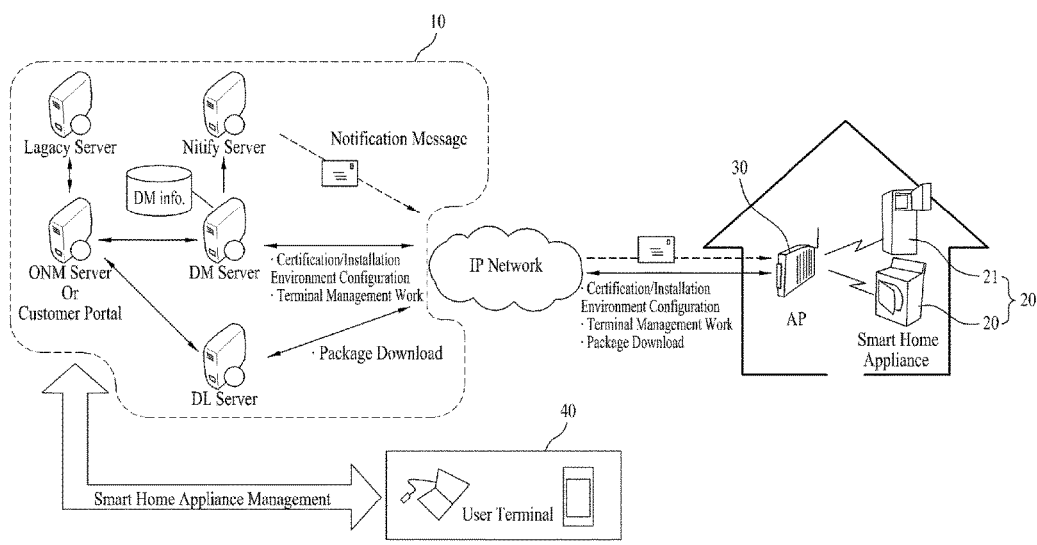

[Fig. 3]
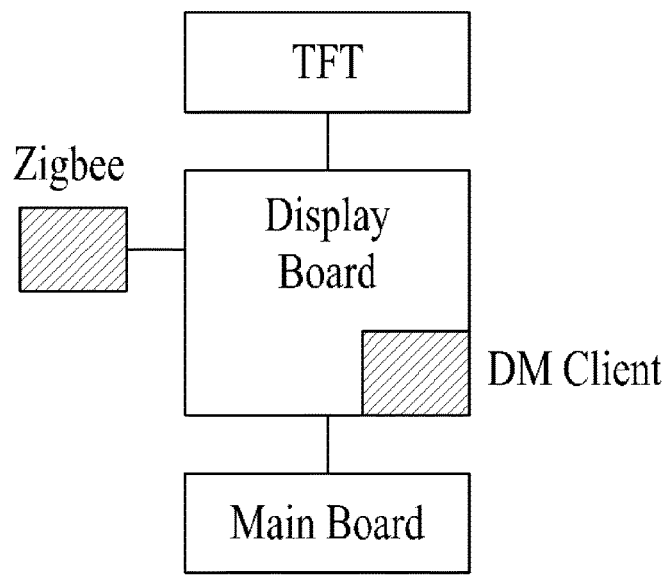
[Fig. 4]
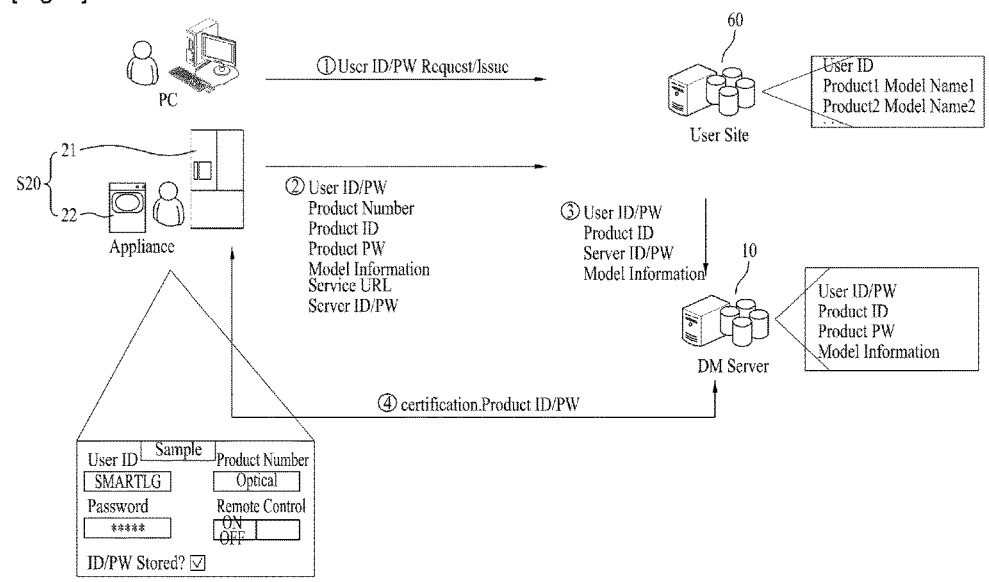

[Fig. 5]
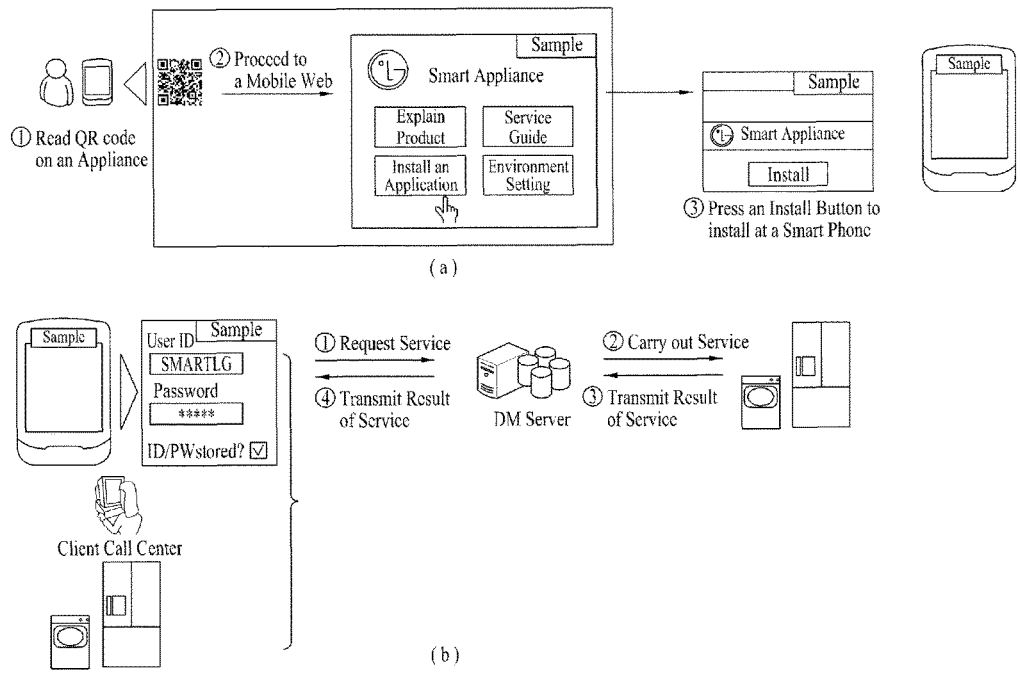
[Fig. 6]
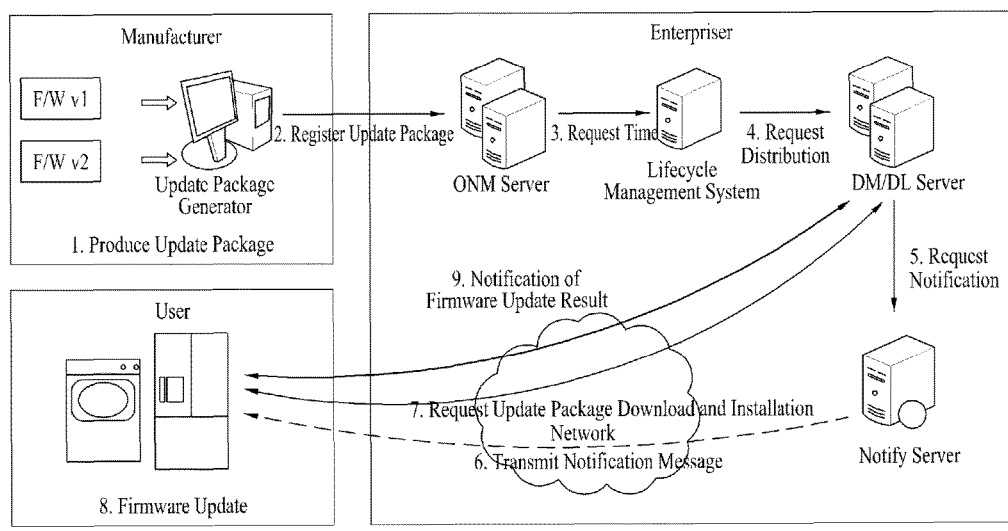

[Fig. 7]
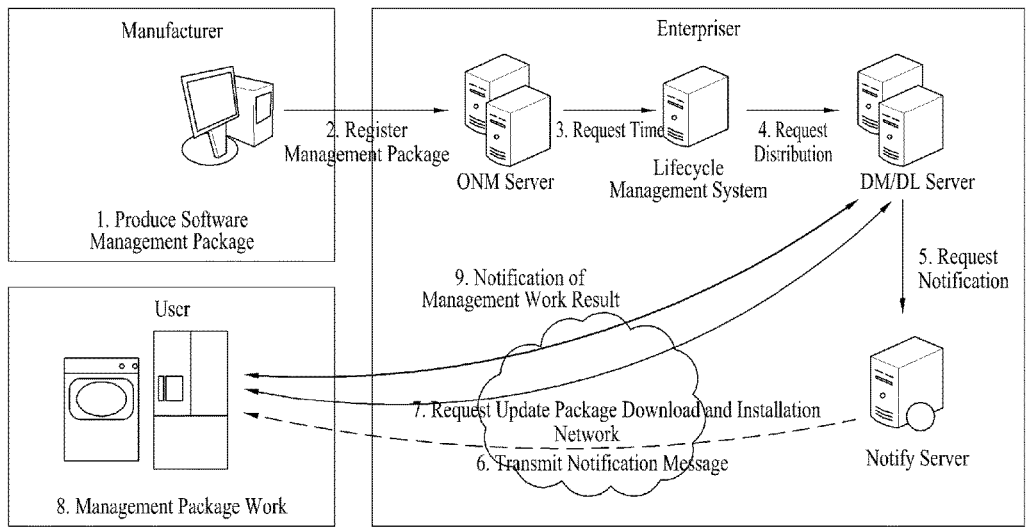
[Fig. 8]
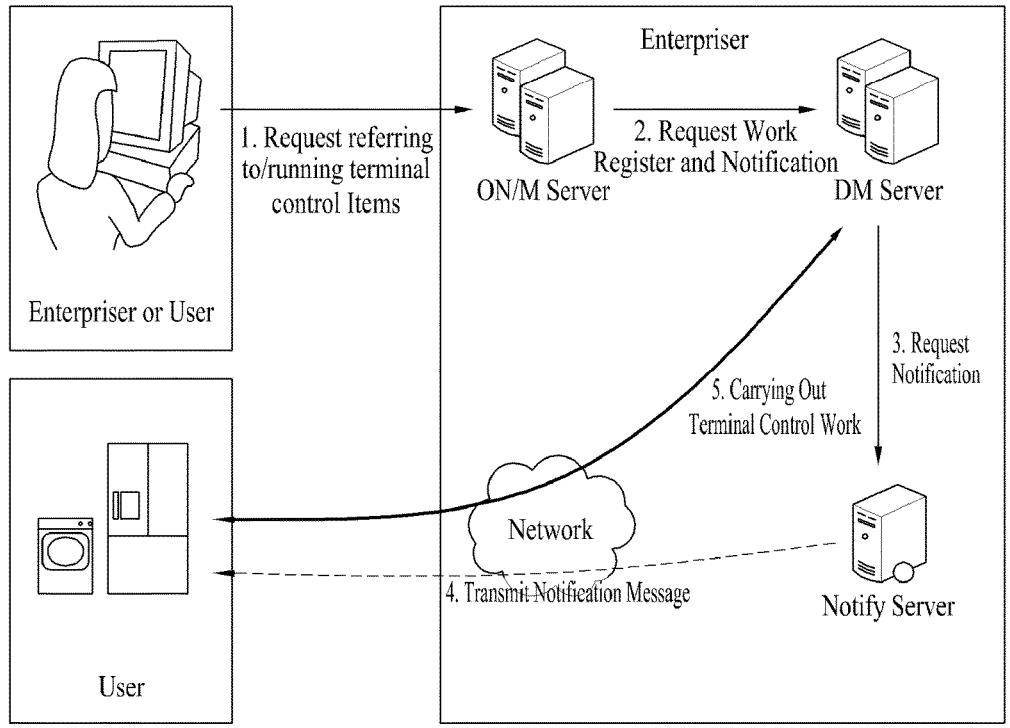

[Fig. 9]
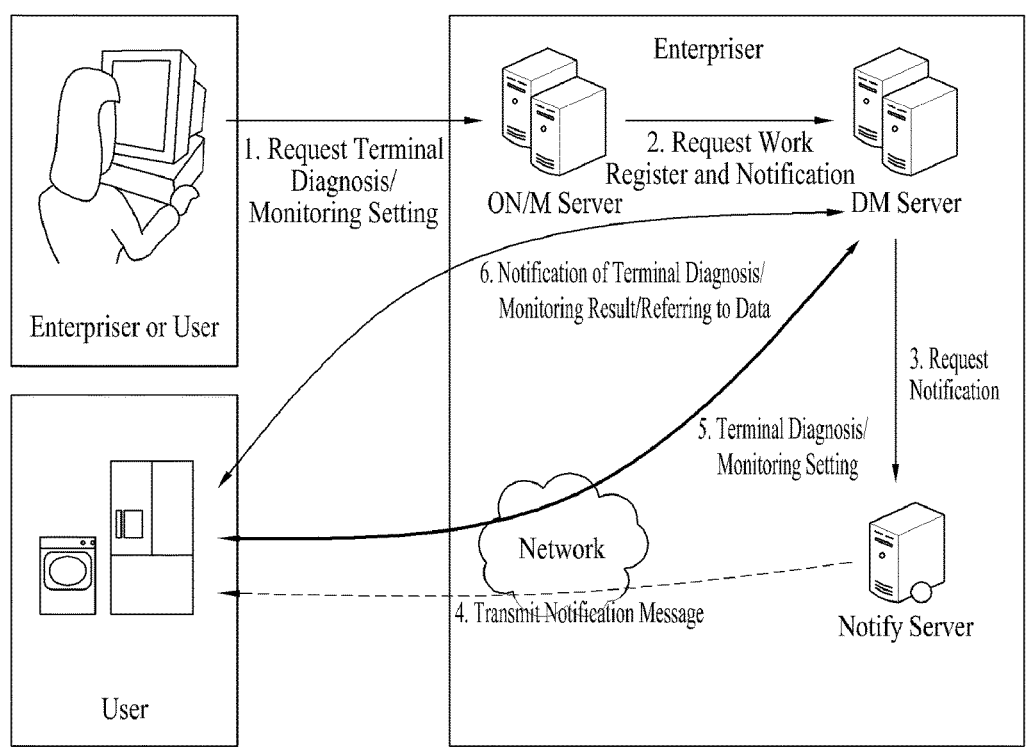

[Fig. 10]
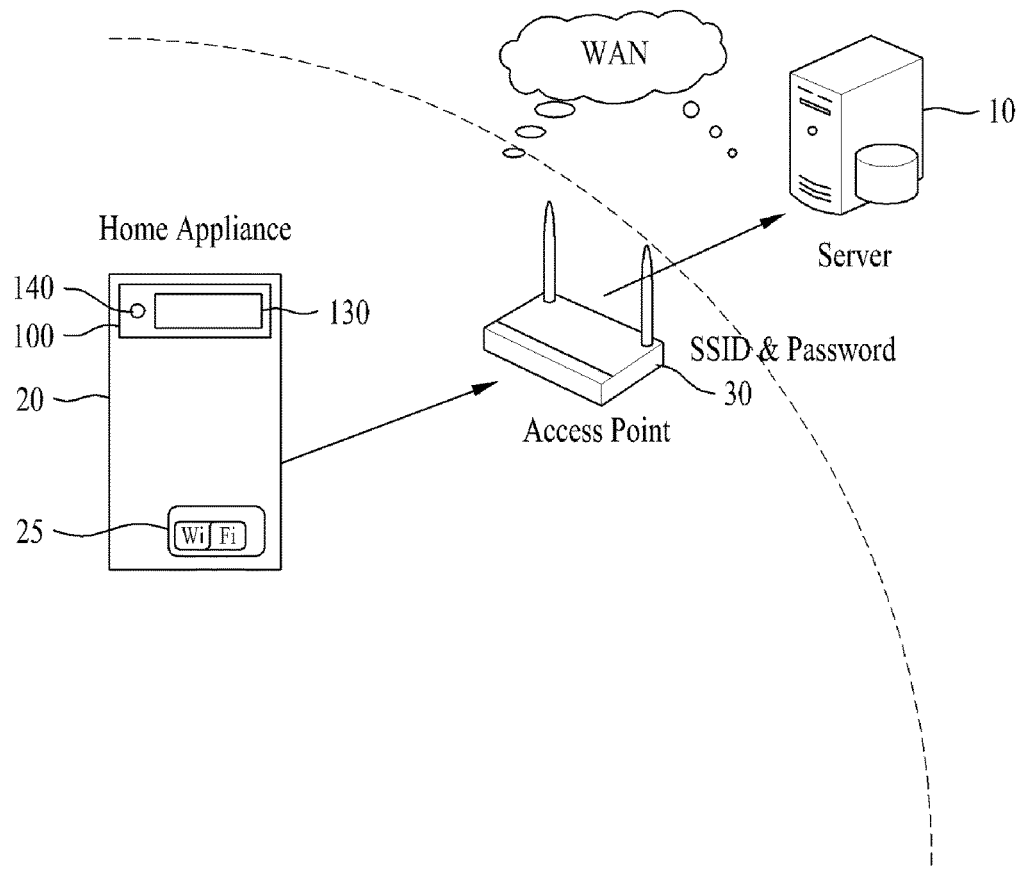

[Fig. 11]
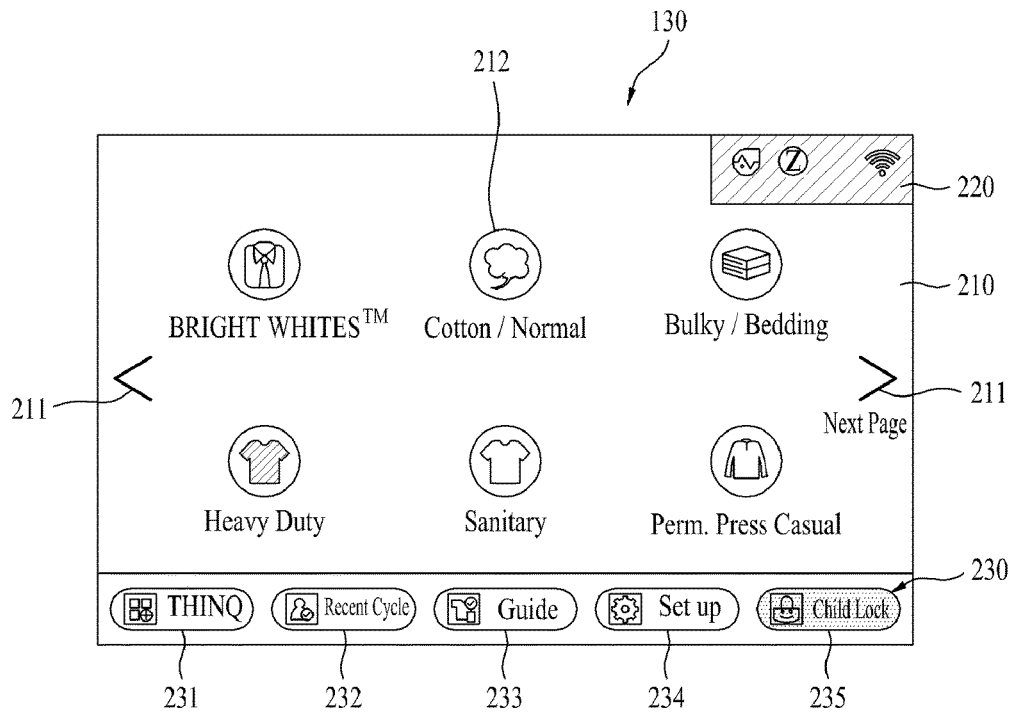
[Fig. 12]

[Fig. 13]
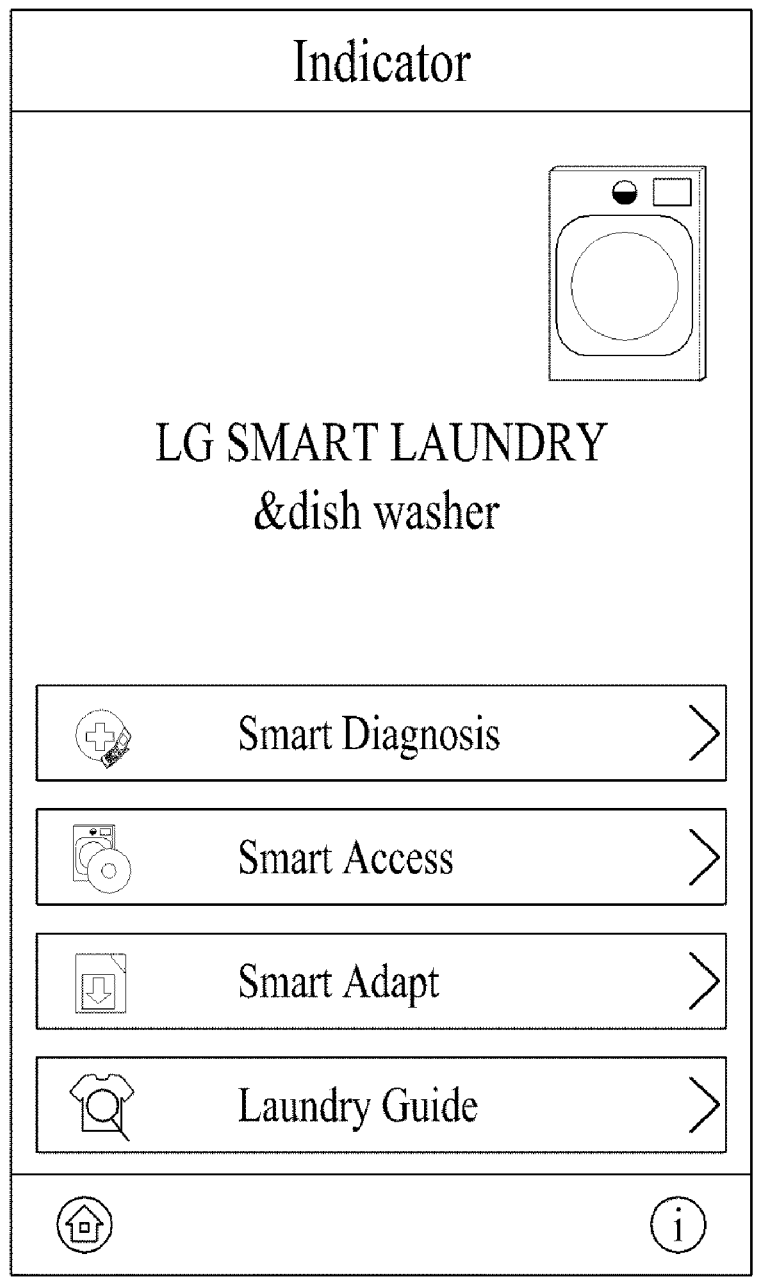

[Fig. 14]

Indicator

Please enter your ID and Password
You registed in us.smartthing. com

Current residence

ID name

Password

☐ Remember me

Log In

How to register

[Fig. 15]
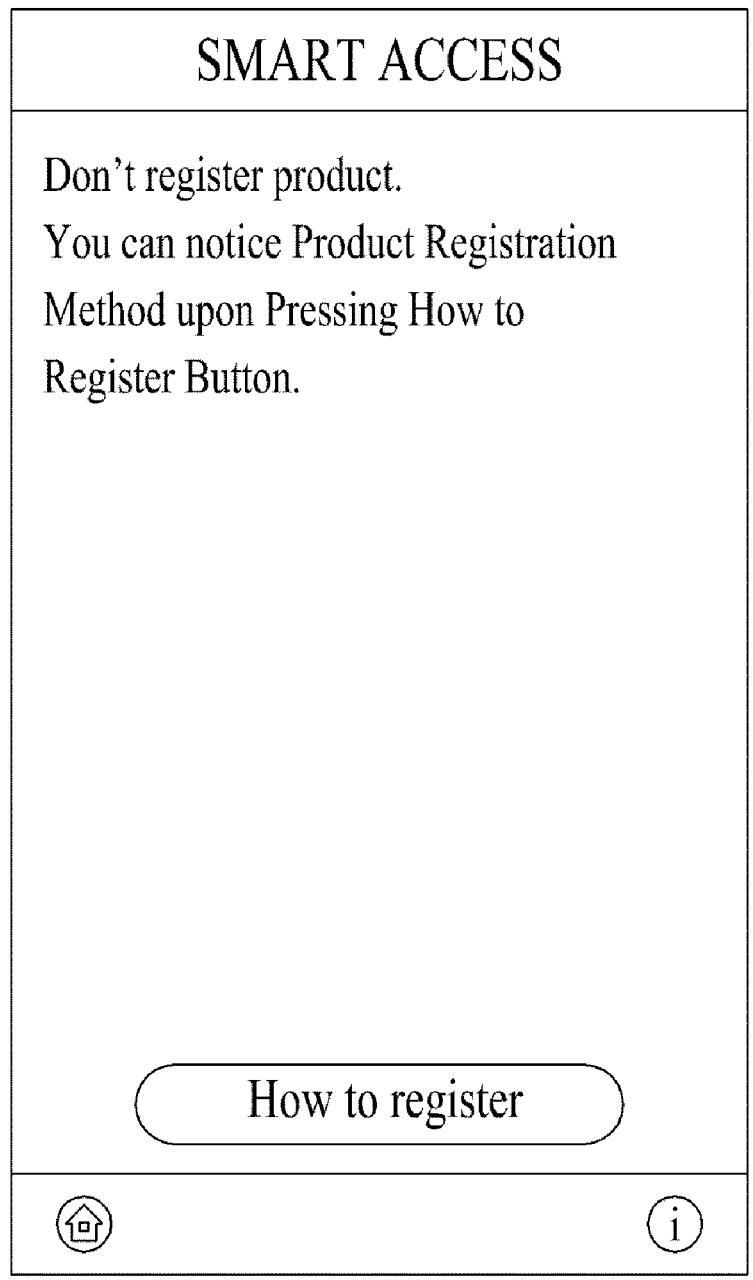

[Fig. 16]
| SMART ACCESS |
|---|
| Please, select the product you want to controlling & monitoring. |––|
| 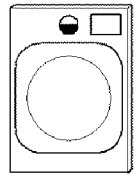 Washer |
| 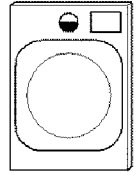 Dryer |
|                                      |

[Fig. 17]
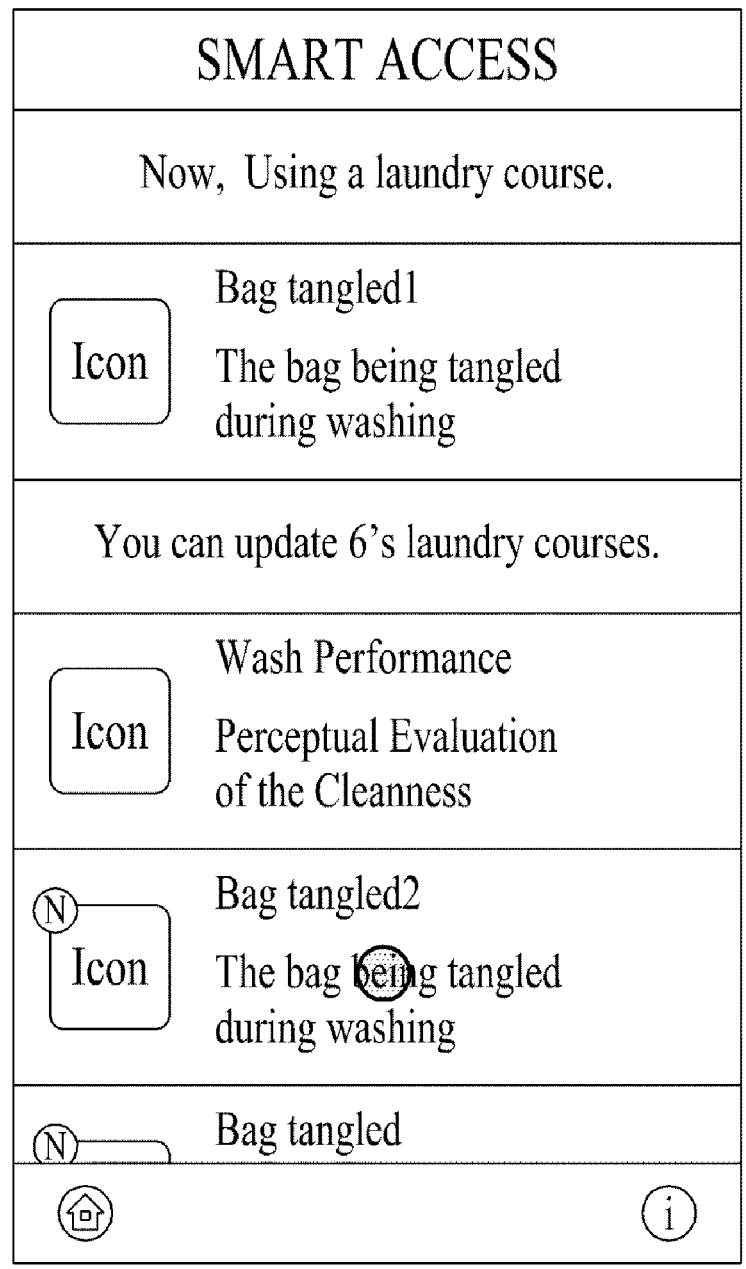

[Fig. 18]

| SMART ACCESS |
|---|
| Now, Using a laundry course. |
| Icon — Bag tangled2 / The bag being tangled during washing |
| You can update 6's laundry courses. |
| Icon — Wash Performance / Perceptual Evaluation of the Cleanness |
| Icon (N) — Bag tangled3 / The bag being tangled during washing |
| (N) Bag tangled |

ONLINE SYSTEM AND METHOD FOR USING THE SAME

This application is a 35 USC § 371 National Stage entry of International Application No. PCT/KR2012/006165 filed on Aug. 2, 2012, and claims priority of Korean Application No. 10-2011-0083698 filed on Aug. 22, 2011, which are hereby incorporated by reference in its entirety.

TECHNICAL FIELD

The present invention relates to a laundry machine, and more particularly, to a laundry machine which can perform, not only original functions of the laundry machine, but also additional functions by communication with an outside of the laundry machine. The additional functions include extended functions from the original functions of the laundry machine and include new functions which have no relation to the original functions of the laundry machine. Such a laundry machine may be called as a smart laundry machine.

The present invention also relates to an online system including the smart laundry machine, which enables to use the smart laundry machine at a low cost, easily.

The present invention relates to an online system for updating a course of a smart laundry machine through an external terminal, and a method for using the same.

The present invention also relates to a smart home appliance in a further extended mode, and an online system including the same, and a method for using an online system.

BACKGROUND ART

A washing machine which washes clothes is a typical laundry machine, and a dryer which dries clothes may also be called as the laundry machine. Of course, a washing and drying machine which can wash and dry clothes may also be called as the laundry machine.

Recently, a refresher which refreshes clothes, not with water, but with hot air or steam, is introduced to marketplaces, and may also be called as the laundry machine.

Along with this, a dishwasher may also be called as the laundry machine, though the dishwasher does not wash the clothes. Therefore, the laundry machine in this specification includes all of the different kinds of machines described above.

The specification will describe the laundry machine taking a washing machine as a typical example. The laundry machine is applicable to other kinds of laundry machine if the laundry machine does not exclude, or in contrary, to the other kind of laundry machine.

FIG. 1 illustrates a schematic view of a control panel in a related art washing machine, which is also applicable to the present invention.

The control panel is provided for interfacing with a user. Therefore, in general, the control panel is provided to a front of the washing machine for user's easy access and operation. The control panel has various buttons for user's operation, and may have various display units for providing information to the user.

A main function of the washing machine is washing. Accordingly, the washing machine is provided with a course selection unit 110 or a main function selection unit for selecting various washing courses, for the user to select a course. As an example, the course selection unit 110 may be provided in a shape of a rotary knob. In order to make user's course selection easy, a course indicating unit 111 may be provided to the control panel 100, for enabling the user to select a desired washing course by handling the course selection unit 110 to match with the course indicating unit.

FIG. 1 illustrates a schematic view showing the course indicating unit 111 having different washing courses indicated thereon around the rotary knob 110 so that the user may select a washing course by turning the rotary knob 110. In order to indicate washing course selected thus, an indicating unit 121 may be provided, and with reference to this, the user may notice the washing course selected thus easily. The indicating unit 121 may be embodied with a flashing LED or the like.

An option selection unit 120 may be provided for adding functions to, or changing, the main functions. The option selection unit 120 may be provided in a variety of modes. As an example, FIG. 1 illustrates the option selection unit 120 which enables to select options related to washing, rinsing, spinning, a water temperature, drying, steam, and scheduled operation. An option indicating unit 122 may also be provided, which may indicate selected the option, embodied with an LED the same as before.

The control panel 100 may be provided with a state indicating unit 130 for indicating a state of the washing machine. The state indicating unit 130 may indicate the present operation state of the washing machine, a user's course or option selection state, information on time, and so on.

For an example, if the washing machine performs a rinsing step presently, the state indicating unit 130 may indicate "in a rinsing step". If the washing machine is waiting for a user's course input, the state indicating unit 130 may indicate "Please input a washing course". And, the state indicating unit 130 may indicate the present time, or a time period (A remained time period) until the washing machine carries out an entire washing course to finish operation.

In the meantime, the control panel 100 may be provided with a power selection unit 140 for applying or cutting off power to the washing machine, and a run/pause selection unit 150 for putting the washing machine into operation or pause.

The control panel 100 described before and the washing machine including the same have the following problems.

Besides a configuration for basic user interface, the control panel 100 is difficult to embody additional user interface due to a problem from a view point of space. Of course, though a complicate user interface may be embodied at the control panel 100, the complicate user interface has a problem in that user's excessive concentration and knowledge on operation is required. And, since the control panel 100 has difficulty in fabrication and requires a large sized memory, the washing machine itself becomes expensive too much.

Along with this, since the selection units 110 and 120 and the indicating units 111, 121, and 122 have respective functions set already, extension of the functions are not easy.

And, in general, the washing machine is positioned at a washing room which is not a place the user accesses thereto, frequently. Therefore, the user can not but has much trouble of personally entering in the washing room and accessing to the washing machine only for using the washing machine. And, even if different pieces of information are indicated with the indicating units 111, 121, 122, and 130, the indication of information may be meaningless if the user does not access to the washing machine, personally.

Consequently, it is required to provide a laundry machine which can carry out, not only the original functions of the laundry machine, but also the extended functions from the original functions of the laundry machine or new functions not related to the original functions of the laundry machine.

Along with this, it is necessary to provide a laundry machine which can embody extension of a function or a new function without requiring replacement or modification of a related art control panel, i.e., without change of hardware of a washing machine.

Moreover, most of the laundry machines have difficulty of user interface extension due to limitations on space or expense. Particularly, the user needs to update a new course in addition to courses provided to the laundry machines in default. However, user's desire to provide additional selection means to the related art laundry machine for selecting an updated course has gone contrary to the user's wishes.

Consequently, provision of a laundry machine is required, which enables the user to perform the course update easily, and notice the updated course easily, and an online system including the same.

Particularly, provision of a laundry machine is required, which can embody extension of a function, or additional function or a new function without requiring replacement or modification of a related art control panel, i.e., without change of hardware of the washing machine.

Along with this, it is required to provide an online system and a method for providing the same which can perform course update easily according to user's need regardless of place. That is, it is preferable that the update can be performed, not only at the laundry machine, but also through the external terminal, such as a smart phone.

In the meantime, course updating may be required, not only for the laundry machine, such as a dryer, a washing machine, a refresher, a dishwasher, but also for many home appliances, such a an oven, a cleaner, refrigerator, a water purifier, an air conditioner, and so on. That is, updating of different forms of new courses, such as a power saving course, a power course, a product diagnosis course other than functions performed in default is required.

Therefore, the problem will not be a problem only limited to the laundry machine, merely. The problem may also be applicable to the refrigerator, the oven, the air conditioner, or a robot cleaner. This is because such home appliances also have a configuration matching to the control panel of the laundry machine, i.e., a configuration for user interface. And, this is because the home appliances also have a selection unit for performing an original function and a display unit matching to the selection unit, and requirements for extension of a function and embodying a new function is the same with the laundry machine. That is, this is because most of the home appliances also have difficulty of user interface extension due to limitations on space or expense.

Accordingly, the specification will be described focused on a washing machine as a typical example of the home appliances, and may be applicable to other home appliances as far as the home appliance is not exclusive and contrary to other home appliances.

DISCLOSURE OF INVENTION

Technical Problem

To solve the problems, an object of the present invention is to provide an online system, and a method for using the same.

An object of the present invention is to provide a home appliance which can carry out, not only the original functions of the home appliance, but also functions extended further or new functions by embodiments of the present invention.

Another object of the present invention is to provide a home appliance which is made to enable to make communication with an outside of the home appliance for receiving different pieces of information from a server or an external terminal easily for extending functions of, and convenient use, of the home appliance by using the information by embodiments of the present invention; and an online system including the same.

Another object of the present invention is to provide a home appliance which is made to enable to make communication with an outside of the home appliance for transmitting different pieces of information on a laundry machine to a server or an external terminal for extending functions of, and convenient use, of the home appliance by using the information by embodiments of the present invention; and an online system including the same.

Another object of the present invention is to provide an online system for updating a course of a laundry machine through an external terminal without direct communication between the laundry machine and the external terminal by an embodiment of the present invention, and a method for using the same.

Another object of the present invention is to provide a home appliance, particularly, a laundry machine, which can enhance user's satisfaction and reliability by an embodiment of the present invention.

Another object of the present invention is to provide an online system including not only a laundry machine, but also home appliances which require a course update and a method for using the same, for performing secure updating by an embodiment of the present invention.

Solution to Problem

To achieve these objects and other advantages and in accordance with the purpose of the invention, as embodied and broadly described herein, an object of the present invention provides an online system having a, a server and an application mounted thereto, and a method for using the same. Particularly, the home appliance may be a laundry machine. And, the online system may include a user site for registering user information. The user information may include a user ID and password.

The user information registered through the user site may be transmitted to, and registered to the server. And, the user information may be registered to the server together with the home appliance when the home appliance is registered to the server.

When the home appliance is registered to the server, the user information registered to the user site and a device ID unique to the home appliance may be transmitted to the user site, altogether. The user site can match the user information and the device ID to each other and can certify the same. And the user site transmits the user information to the server, and the server can register the user and the home appliance.

An embodiment of the present invention provide a method for using an online system including the steps of log in a server by transmitting user information to the server through an external terminal, selecting a laundry machine of which course updating is desired through the external terminal and transmitting the same to the server, receiving updatable course information from the server, and displaying the information on the external terminal, selecting an updating desired course through the external terminal, and transmitting selected course information to the server, and updating the laundry machine with the selected course through the server.

The server may transmit updatable course information provided applicable to the laundry machine based on selected laundry machine information to the external terminal.

The server may transmit existing updated course information and newly updatable course information of the laundry machine to the external terminal, with the existing updated course information made distinctive from the newly updatable course information.

The external terminal may display the existing updated course information and the newly updatable course information, with the existing updated course information made distinctive from the newly updatable course information. According to this, the user can notice the updated course to the home appliance presently and the newly updatable course with this easily.

If the external terminal selects the newly updatable course, the existing updated course may be replaced with the selected new course to update the existing updated course of the laundry machine.

It is preferable that the user information may include user ID and password registered to the server.

It is preferable that the server is plural, and the user can select a server the user is to access through the external terminal. The server may be plural according to regions and language used. However, a selected server is required to be same with the server the laundry machine is registered thereto.

The server may include a step for determining whether the laundry machine of the user is registered or not after log in, and transmitting a result of the determination to the external terminal. The external terminal indicates a registered laundry machine for enable the user to select if any. This is because a plurality of the laundry machines may be registered. For an example, a washing machine and a dryer may be registered. And, the external terminal may indicate a method for registering the laundry machine to the server if there is no registered laundry machine. In this case the user may input the user information to the server through the laundry machine to register the laundry machine to the server. In this instance, the server can perceive the laundry machine information with reference to information from the laundry machine, and may store the laundry machine and the user information, with the laundry machine information matched with the user information.

It is preferable that the laundry machine has a WiFi communication module mounted thereto, with a server address for communication with the server.

The laundry machine includes a touch display for displaying or providing input means for connecting the WiFi communication module to the server. The input means may be a menu button.

The laundry machine can embody steps for communication connection to the server through the touch display.

The SSID information on an AP and the user information may be inputted to the touch display, for the WiFi communication module to communicate with the server through the AP, and to register the laundry machine information and the user information to the server, altogether.

An embodiment of the present invention provides a method for using an online system, including the steps of registering a user to a server by using user information inputted to a user site, inputting the user information to an external terminal provided to enable to update a course of a laundry machine to log in the server, determining whether the laundry machine of the user is registered to the server or not after log in, and transmitting a result of the determination to the external terminal, the external terminal indicating a registered laundry machine for enabling the user to select if any, and indicating a method for registering the laundry machine to the server if there is no registered laundry machine, if a laundry machine of which course update is desired is selected through the external terminal, transmitting information on the selected laundry machine to the server, receiving updatable course information from the server, and displaying the same on the external terminal, selecting an update desired course through the external terminal, and transmitting the selected course information to the server, and updating the laundry machine with the course selected thus through the server.

The server transmits existing updated course information and newly updatable course information of the laundry machine to the external terminal, with the existing updated course information made distinctive from the newly updatable course information.

If a new course is updated, the external terminal replaces an existing update course with the new update course. And, if the external terminal selects a newly updatable course, the existing updated course may be replaced with the selected new course to update the existing updated course of the laundry machine.

The laundry machine may include a touch display which displays default courses, user generated courses, and updated courses for enabling the user to select.

If the external terminal selects a new updatable course and finishes updating the new updatable course, the touch display of the laundry machine may display the selected new course replacing the existing updated course.

An embodiment of the present invention may provide an online system including a server for providing remote management service, a user site for registering a user by inputting user information thereto, and transmitting the user information to the server, to register the user to the server, a home appliance having a unique ID for transmitting the user information registered to the user site and the device ID to the user site or the server to register to the server, and communication connected to the server through WiFi communication connection to the AP for receiving remote management service through the server, and an external terminal having an application mounted thereto which is communication connected to the server, for transmitting the user information and home appliance information desired to have remote management service provided thereto to the server, and requesting the remote management service of the home appliance to the server on behalf of the home appliance.

An embodiment of the present invention may provide a laundry machine having remote management service provided thereto through a server, including a main controller, a display provided to receive user AP information to be communication connected to information on a user registered to a user site, and a WiFi communication module for transmitting the user information and the user AP information inputted to the display to the user site to register the laundry machine to the server, and maintaining communication connection to the server for having remote management service requested by the laundry machine through an external terminal communication connected to the server after the registration.

A display controller may be provided separate from the main controller for controlling the display, and it is preferable that the WiFi communication module is provided to the display controller.

Along with this, an embodiment of the present invention may provide a recording medium having the method for using an online system stored therein.

The foregoing embodiments can be embodied compositely in a range the embodiments are not contrary to, or exclusive from, one another, and can be embodied with characteristics described in the specification, compositely.

Advantageous Effects of Invention

An embodiment of the present invention can provide a laundry machine which can perform a further extended function without change of hardware. Especially, the present invention can provide a laundry machine or a home appliance which can provide extensibility without requiring a separate device for indicating and selecting a newly updated course.

An embodiment of the present invention enables communication between a laundry machine and a server to use a variety of services provided from the server at the laundry machine.

An embodiment of the present invention provides an online system for updating a course of a laundry machine through an external terminal without direct communication between the laundry machine and the external terminal, and a method for using the same.

An embodiment of the present invention provides an online system including, not only a laundry machine, but also home appliances, which requires a course update, and a method for using the same, for performing secure updating.

An embodiment of the present invention enables secure communication connection between a home appliance in a building and a server through a WiFi communication module and a fixed AP in the building. And, an external terminal communicates, not with the home appliance directly, but with the server. Accordingly, communication among the home appliance, the server, and the external terminal becomes smoother and securer, enabling to update a course of the home appliance through the external terminal, more smoothly.

BRIEF DESCRIPTION OF DRAWINGS

The accompanying drawings, which are included to provide further understanding of the disclosure and are incorporated in and constitute a part of this application, illustrate embodiments of the disclosure and together with the description serve to explain the principle of the disclosure.

In the drawings:

FIG. 1 illustrates a schematic view of a control panel of a laundry machine which is an example of a home appliance.

FIG. 2 illustrates a schematic view of an entire configuration in which servers, home appliances, and external terminals are interrelated, which may be embodied by an embodiment of the present invention.

FIG. 3 illustrates a block diagram showing a mode of an embodiment in which a DM client is mounted to a display board of a home appliance.

FIG. 4 illustrates a schematic view of an embodiment of a configuration and a procedure of signup and activation.

FIG. 5 illustrates a schematic view of an embodiment of a procedure of downloading an application from an external terminal, and a configuration and a procedure for a user to request a management service.

FIG. 6 illustrates a schematic view of an embodiment of a configuration and a procedure on firmware or software upgrade.

FIG. 7 illustrates a schematic view of an embodiment of a configuration and a procedure on software management service.

FIG. 8 illustrates a schematic view of an embodiment of a configuration and a procedure on remote control service.

FIG. 9 illustrates a schematic view of an embodiment of a configuration and a procedure on diagnosing or monitoring management service.

FIG. 10 illustrates a diagram showing a procedure and a configuration for communication connection of a home appliance.

FIG. 11 illustrates a diagram of an initial frame of a display unit in a home appliance.

FIG. 12 illustrates a diagram showing an embodiment of a frame on a display unit in a home appliance for a home appliance registration.

FIG. 13 illustrates a diagram showing an embodiment of a frame on an external terminal for online service selection.

FIG. 14 illustrates a diagram showing an embodiment of a frame on an external terminal for log in.

FIG. 15 illustrates a diagram showing an embodiment of a frame on an external terminal when there is no registered product.

FIG. 16 illustrates a diagram showing an embodiment of a frame on an external terminal when a plurality of products are registered.

FIG. 17 illustrates a diagram showing an embodiment of a frame on an external terminal for updating a course.

FIG. 18 illustrates a diagram showing an embodiment of a frame on an external terminal when updating of a course is finished.

BEST MODE FOR CARRYING OUT THE INVENTION

Reference will now be made in detail to the specific embodiments of the present invention, examples of which are illustrated in the accompanying drawings. Wherever possible, the same reference numbers will be used throughout the drawings to refer to the same or like parts.

FIG. 2 illustrates a schematic view of an embodiment of an online system which can embody the present invention, showing an entire configuration in which home appliances in a home are communication connected to, and managed by, a server.

In order to carry out remote management service, a server 10 is required for managing all of the home appliances to be managed. The home appliances 20 and 21 to be managed are communication connected to the server for carrying out an order transmitted from the server 10. A service request may be received at the server through the home appliance 20. Moreover, in order to receive the service request from the user through means other than the home appliance, separate means, such as an Internet site (Hereafter"User site", See FIG. 4), an external terminal or a user terminal 40, may be provided. Detail examples of the remote management service will be described, later.

In this instance, the external terminal or the user terminal 40 is a device provided separate from the home appliances or the server, such as a cellular phone, a smart phone, a notebook, and a computer having a communication module to enable communication with an outside of the device.

An enterpriser who carries out management of the home appliances can provide the remote management service by constructing the server. And, if required, the enterpriser may construct the user site described above.

The user may have the remote management service by purchasing a product 20 which can have the remote management service provided by the server 10. The product may be provided with a communication module for communication with the server 10 and a client side protocol for carrying out the order from the server. In the meantime, for an existing product which can not have the management service provided by the server, a separate device having the communication module and the client side protocol may be used. By purchasing and connecting the separate device to the existing product, the existing product may have the remote management service provided thereto.

The product 20 intended to have the remote management service from the server 10 may register a unique device ID of the product 20 to the server 10 for management by the server 10.

If an access is made from the home appliance 20 to the server 10, the server can identify the home appliance with the device ID. The server may have characteristic information (For an example, a kind of the product, model information, and so on) on the home appliance registered thereto together with the device ID. In this instance, though the device ID may be made without relation to the characteristic information on the product, such as the kind of the product, and the model information, the device ID may be encoded together with the characteristic information on the product. Accordingly, the server 10 may also be made to perceive the kind of the product or the model information on the product only with the device ID.

The user may have the remote management service for the home appliances 20 registered to the server 10 provided thereto upon request a service to the server 10 through the home appliances. For an example, if the user selects and inputs a desired service to a display window (Display unit) in a refrigerator 21, the refrigerator 21 can request the service to the server 10.

In the meantime, in many cases, the home appliances, such as the refrigerator, a cleaner, the oven, the air conditioner, and a water purifier, do not always position adjacent to the user. Therefore, a service request to the server through the home appliances 20 may not be easy. Moreover, in many cases, the home appliances may not have devices which can receive or display different pieces of information provided thereto. Accordingly, the service may be requested to the server through an external terminal 40 the user always carries, such as the smart phone. For this, an application may be installed to the external terminal 40 for embodying the service. Since the external terminal 40, such as the smart phone, has devices provided thereto for receiving or displaying the different information, the request for service can be made, very conveniently.

And, though it will be described later, remote management, remote control, monitoring, and diagnosis of the home appliances may be made through the application. Those functions are one example of the remote management service described before.

In this case, the external terminal 40 communicates with the server 10 directly, and the server 10 communicates with the home appliances 21 and 22. With this, the user can request the remote management service through the external terminal 40, and can also notice information on carrying out and finish of the service, easily.

However, in order to request, and carrying out, the service, it is required to specify relations among the user's external terminal 40, the home appliance 20 service for which is desired, and the server 10. That is, if the user accesses to the server 10 through the home appliance 20, though a service object can be specified to the server as the access is made through the ID of the home appliance at the time of the access, if the access is made not through the home appliance 20, it may be required to determine how to specify a service objective home appliance.

As an example, the user may access to the user site (See FIG. 4), inputs the device ID of the home appliance desired to have the service provide thereto, and requests the service. However, in this case, the user has inconvenience of recollecting entire device IDs of the home appliances the user has.

The user site may be made to resolve such inconvenience. The user may signup to the user site and have a user ID and a password given to the user. The user may log-in the user site and register all the home appliances the user owns thereto. The home appliances registered to the user site may be registered to the server together with the user ID. This may be done by automatic transmission of the user ID and the device IDs matched to the user ID from the user site to the server. With above steps, the server may have user information on the user, and home appliance information on the home appliances stored therein. Of course, the user information and the home appliance information is stored in the server matched to each other.

In the meantime, the user may also signup the user site with the application mounted to the external terminal to have the user ID and password given thereto. Of course, the user may also register all of the home appliances the user owns to the user site. The application may be provided for the remote management service of a particular home appliance, or a plurality of home appliances. Detailed items on this will be described, later.

In this instance, the user may access to the user site to register user information including the user ID and password to the server. The registration of the home appliance to the server may be performed through the home appliance. That is, since the home appliance has the server address, by transmitting the user information and the home appliance information to the server, communication between the two may start. In this instance, the server matches the home appliance to the user.

With this, the server can know information that a particular user has a particular product, and where the particular product is installed.

Moreover, the registration of the home appliances 20 to the server 10 described before may also be made with an activation procedure to be described later.

In any case, if the user has the ID issued thereto, the ID may be registered to, and managed by, the server 10, together with the home appliance information of the user, i.e., unique information on products, such as the device IDs.

The service received from the user through the user site, the external terminal 40, or the home appliance 20 may be carried out as a manager gives an order to the server 10 on the management service. Or, by direct communication with the server through an open API of the server, the user site, the external terminal, or the home appliance 20 may make management request to the server, directly.

The server 10 has a server side protocol provided thereto for the management service, wherein the server side protocol carries out the management service request thus in interrelation with a server side protocol of the product.

As a protocol for carrying out the management service between the server 10 and the home appliance 20, an OMA DM (Open Mobile Alliance Device Management) protocol may be used. Therefore, if the OMA DM protocol is used, it may be said that the server side is a DM server, and the home appliance side is a DM client. Of course, not the OMA DM, but other solution may be used. Though the embodiment suggests using the OMA DM protocol, the present invention is not limited to this.

The management service may have the following management details.

Bootstrap: In order to carry out an initial management session, the DM client needs certification information from the DM server, and network setting information for connection to the network. A step for above is called as Bootstrap.

Provisioning: The home appliance which carries out the management session initially is registered to the DM server with the Bootstrap, and configuration of the home appliance is updated for providing the service to the home appliance. A step for above is called as Provisioning.

Configuration Management: Management work for referring to, changing home appliance related setting information, or setting, referring to, or changing service related information is called as Device configuration management.

Control Management: Management work for controlling the home appliance is called as Control Management.

User Alert: By providing an alert signal to the DM client, the DM server may inform detail of the management work to the user, or obtain permission from the user. That is, by interaction with the user, the server can provide improved management work.

Diagnostic and Monitoring: During the user uses the home appliance, the home appliance may cause poor performance or malfunction. The server is required to perceive, or able to perceive, such a state in advance, and provide a secure product use environment to the user by taking an action proper to the state perceived thus. Such work is called as diagnostic and monitoring.

Firmware Update Management: Management work carried out in a case a trouble, a functional change, or updating of firmware takes place at a home appliance after sold by a manufacturer.

Software Component Management: Management work carried out for installing, updating, or erasing a software component from the home appliance.

Backup and Restore Management: Management work carried out for backing-up/restoring data on the home appliance to the DM server.

In the meantime, the server 10 may be installed distributed to many places. For an example, a server 1 may be installed in Korea and a server 2 may be installed in the USA.

And, the server may be separated into a plurality of servers according to services of the servers. FIG. 2 illustrates a schematic view of an example of the server 10 separated into a DM server, a Notify server, a DL server, an ONM server, and a Legacy server. Thus, if the server is separated according to services of the servers, when a particular service is carried out, the DM server may prepare for, or carry out other service. Accordingly, a plurality of services may be processed at a time.

In carrying out services, the servers may access to respective service objects to carry out respective services, directly.

Some of the servers may be made to be able to access to service objective home appliances, directly. For an example, the notify server can transmit a notice to the service objective home appliance directly, and the DL server can transmit upgraded firmware to the service objective home appliance, directly.

The server 10 may have a configuration varied with detail of the management service. For an example, if the detail of the management service is the firmware update only, since the service can be made by the DM server, the notify server, and the DL server, the other servers may not be necessary. And, if it is arranged that the service is carried out without a notification procedure on the firmware update to the user, the notify server may not be necessary.

Though the embodiment suggests a configuration of the server as shown in FIG. 2 as an example, taking the firmware update, the software (Inclusive of different contents) management, the home appliance diagnosis, the home appliance monitoring, refrigerator expiry date notification, refrigerator food list provision, washing course upgrade into account, the present invention is not limited to the configuration of the server as shown in FIG. 2.

A configuration and a communication environment of each of online systems will be described in more detail. All of the following details may not be essential ones to be provided without fail. And, there may be configurations added to the following contents by description made on other portions of the specification.

(1) The Server may have the following configuration.

1) DM Server

The DM Server provides a service of giving a management order to the DM client. That is, by means of the management order, the DM Server provides a management function of processing firmware update (Modem firmware/OS) management work, software management work, diagnostic management work, and so on, remotely. The DM Server may include a Session Management region, a Security Management region, a DM Protocol Process region, and a SyncML Protocol Engine region.

2) DL Server

The DL server transmits a file to the DL client. That is, the DL server provides a function in which the DL server transmits information on the file intended to transmit through a DD (Download Descriptor), for the DL client to download the file, exactly. In this instance, the DL client is the home appliance which downloads the file. In the files downloaded thus, there are a firmware update package and a software management package. The DL server may include a Session Management region, a Package Management region, and a Download region.

3) ONM Server or User Portal

The ONM Server provides a service of interfacing with the DM or DL and the Legacy servers, and embodying a business logic. The manager may give a management order, or refer to management information, through a management web page of the ONM Server.

The User Portal provides some of the functions of the ONM Server to the user. In this instance, the functions of the ONM Server are embodied through the open API of the DM Server. The user may request the management service to the DM Server through the user portal.

4) Legacy Server

Representative Legacy Servers the ONM Server is operated interrelated thereto are a server having terminal information transmitted thereto and a server having user information transmitted thereto. That is, the legacy server transmits the user information or the home appliance information to the ONM Server for providing information to embody the business logic.

5) Notification Server

The notification server transmits a notification message from the DM server to the home appliance. The notification server may include a Session Generation region, and a Schedule Management region.

If the home appliance is in a private network, in order to maintain connection to the home appliance, a Connection Manager may be required specially provided to a server side. The home appliance may request a TCP connection after booted automatically, and the connection manager maintains the TCP connection requested thus. The DM Server transmits the notification message through this.

6) Open API

An application at a mobile communication terminal, such as a smart phone, may manage the home appliances through the open API provided by the DM Server, remotely. The Open API will be described, later.

(2) The home appliance may include the following configuration.

1) Communication Module

The home appliance has the communication module mounted thereto. Kinds of the communication module are not limited. The communication module may be a wired communication module or a wireless communication module.

As an example, the communication module may be a communication module from which WiFi is available, or communication module from which PLC communication or Zigbee available.

2) DM Client

The DM client provides a main service of carrying out the management order from the DM Server. That is, in response to the management order from the DM Server, the DM client provides the management functions of processing the firmware update management work, the software management work, the diagnosis management work, and the control management work, remotely.

FIG. 3 illustrates a block diagram showing an example in which the DM client is mounted to the home appliance. In a case of the home appliance having a TFT display provided thereto, the DM client may be mounted to a circuit board (Display board) of the TFT. The main board in FIG. 3 is a circuit board for carrying out an original function of the home appliance. For an example, in general, the washing machine may have a main controller provided to a main board for controlling a water supply valve, and a motor connected to a drum for carrying out washing.

Though the DM client may be mounted to the main board of the home appliance, it is favorable that the DM client is mounted to a display board because a display window may be used more frequently for requesting the management service.

3) DL Client

The DL client provides main service of downloading a package file (Firmware update package, Software management package, and so on) from the DL server. The DL client receives a download server URL from the DM client, accesses to a download server, takes a DD (Download Descriptor) from the download server, and carries out the download.

4) Agent

The agent provides a service of carrying out a management service order requested from the home appliance according to detail of the management service. For an example, an update agent provides a service of producing new firmware by using an update package downloaded for firmware updating. The update agent may be embodied in a variety of modes by manufacturers.

5) Bootstrap

The home appliance may include bootstrap information, which will be described in detail in a bootstrap procedure to be described, later.

6) Daemon

The Daemon may provide a service of processing the home appliance making periodic access to the server. It is preferable that the Daemon always maintains a turn on state as far as the home appliance does not have a power cord unplugged therefrom. For an example, even if power to the washing machine is in a turn off state, as far as the power cord of the washing machine is connected to a socket thereof, the Daemon can always maintain the turn on state. If it is necessary to turn on the power to the washing machine by request from the server, the Daemon can transmit an order to the main board to turn on the power.

7) UI (User Interface)

There may be a case permission from the user is required for carrying out the management service, and a case the user requests the management service through the home appliance. As the user interface, a TFT LCD window of the home appliance may be used. Especially, the user interface may be provided to a touch LCD or an LCD display. A display screen may be provided to have a frame of the management service popped-up thereon. Such a management service frame may be provided to input the user ID and the password thereto. In this instance, the user ID and the password may be the user ID and the password given at the time of signup to the user site. A server system can identify the user with the user ID and the password. At the time a service is requested through a terminal, the terminal may transmit the user ID and the password, the device ID, and service requesting information to the server.

However, the user interface is not provided to all the home appliances. This is because embodying interface for the management service in addition to the user interface required for carrying out an original function of the home appliance may require large expense and space.

For an example, embodying character or the like input means, or a display unit for displaying a large amount of information, may not be easy for the home appliance, such as the laundry machine, the air conditioner, the cleaner, the oven, and so on.

Therefore, in order to carry out the management service of the home appliance, an external terminal, such as the smart phone, may be required. This is because the external terminal, such as the smart phone, has the communication module, a memory, OS, the input means, and display unit for itself. Recently, the external terminal with the touch LCD or LED has come into wide use. Therefore, a limitation on the user interface the home appliance has may be supplemented or extended by the external terminal. A detailed example will be described, later.

(3) A communication environment between the home appliances and the server will be described.

Basically, as far as suitable for carrying out the management service, kinds of the communication environment do not matter.

FIG. 2 illustrates a schematic showing an example in which the home appliance having a wireless Internet communication module applied thereto communicates with the server 10 through an AP (Access Point) and the Internet network.

Upon reviewing a communication path starting from the home appliance 20 to the server 10, the communication path after the AP is a public Internet network, and the communication path before the AP is a private Internet network. The home appliances 21 and 22 are given private IPs from the AP 30 respectively, and the AP 30 itself has a unique IP.

The server 10 also has an IP, which may be a unique IP. Therefore, it is preferable that the communication module of the home appliance, for an example, a WiFi communication module, has the unique IP of the server. The home appliance may access to the IP of the server through the Bootstrap described before to make communication between the two.

Then, in order to make the server 10 to know a position of the home appliance 20 for the server 10 to track the position of the home appliance 20, the DM client may keep providing signal to the DM Server. The AP 30 transmits port information the home appliance is connected thereto and the unique IP information of the AP 30 itself to the DM Server, by using the information, the DM Server becomes to know the position of the DM client. Of course, it may be viable that the home appliance may also transmit information on the AP30, and the port information connected to the AP 30 to the server 10 through the AP. Accordingly, if the home appliance 20 transmits the device ID information together with above information to the server, the server system becomes to know which home appliance is at which position, and can access to the home appliance by using the information. In this instance, the user ID and the password may also be transmitted together with above information.

Eventually, the server 10 becomes to know the position of a particular home appliance 20 of a particular user. Therefore, if a particular management service is requested to the server through the home appliance or the external terminal of the user, the server can determine the particular home appliance and carry out the particular management service, easily.

(4) Admin Portal

Though the Admin Portal is not positively required, the Admin Portal enables the manager to carry out the management work, effectively. For an example, in a case of the firmware update, a manager who updates and registers the firmware and a manager who inspects the firmware update file registered thus may cooperate with each other through the Admin Portal. The Admin Portal may include a Firmware Upgrade Process region, a Software Upgrade Process region, a Device Management region, a System Admin region, and a Statistics region.

Detail and procedure of the management service will be described.

(1) Signup and the Home Appliance Activation.

FIG. 4 illustrates a schematic view of the signup and activation.

As described before, if the user accesses to, and signs up the user site 60, the user may be given the user ID and the password.

The Home Appliance Activation may be a procedure for registering the user's home appliance to the server 10. A display screen of the home appliance may have a window which enables the user to input the user ID, the password, and so on pops up. The user may carry out the activation procedure through the window. When the user inputs the user ID, and the password to the window, and inputs an activation order, the home appliance transmits the user ID, the password, the device ID, and the characteristic information of the home appliance to the user site 60. In this instance, the home appliance 20 may have the user ID, and the password inputted thus stored therein. According to this, the user ID, and the password may be used for certification of the user.

The device ID may have been inputted to the home appliance already, or is generated within the home appliance automatically when the activation procedure is carried out. Or, it is possible to make the home appliance to generate the device ID automatically when the home appliance is newly bought and turned on for the first time.

As the characteristic information on the home appliance, there may be model information, a product code, a manufactured date, a manufactured product number, and so on of the home appliance.

And, in the activation procedure, the home appliance may transmit the password of the home appliance, a service URL, a server ID and password. Of the information transmitted to the user site 60 in the activation procedure, the information excluding the user ID, and the password may be generated at the home appliance 20 automatically, or in an already inputted state inputted.

In the activation procedure, the information described before may be received at the user site 60 from the home appliance 20. The user site registers the home appliance at the user ID. According to this, the user site may have the home appliances 20 the user uses registered at each user ID.

Then, the user site 60 transmits the user ID, the password, the device ID, the characteristic information on the home appliance to the server 10. In this instance, the ID and the password of the server may be transmitted, altogether.

The server 10 carries out certification on the information transmitted thus at first. Accordingly, when the certification is passed, the user ID, the password, the device ID, and the characteristic information of the product are registered to the server. In this instance, the device password may also be transmitted, altogether.

The activation procedure may be made regardless of place if a state of a communication environment is provided, in which access to the server and the user site is possible. For an example, a seller from whom you have bought a product may carry out the activation procedure for you.

(2) User's Service Request

The user may request the service at a display screen of the home appliance intended to have the service provided thereto. For an example, after making a frame of the desired service to pop up on the display screen of the home appliance 20, the service request may be made after inputting the user ID and the password. In this instance, the home appliance may transmit the user ID, and the password, together with information on the service request.

Moreover, the user may request the desired service through the user site 60, too. The user site may have a web page provided thereto for the user to request the management service thereto, and the user may also request the desired management service at the web page. Upon reception of the service request from the user, the user site may transmit information on the service request to the server system. In this instance, the user ID, the password, and the device ID may be transmitted, altogether.

Moreover, the user may call a client call center to make the service request. The client call center may be made to receive the management service with an ARS system.

In the meantime, the service request may be made through the mobile communication terminal (The external terminal), such as the smart phone. FIG. 5A illustrates a block diagram showing an example in which a smart phone application is downloaded for having the management service. FIG. 5B illustrates a diagram showing an example in which the service request is made through the smart phone, the client call center, or the home appliance.

In a case the service request is made through the smart phone, after putting the management service application installed at the smart phone into operation, the user may input the user ID, and the password, and then, may request the service. The smart phone may transmit information on the service request to the server system for requesting the service, together with the user ID, the password, and the device ID.

Upon requesting the remote management service for the home appliance to the DM Server with different methods describe above, the DM Server carries out the remote management service for the home appliance. Upon finishing the remote management service, the home appliance informs finishing of the service to the DM Server. In a case the service request is made not from the home appliance, but from the external terminal or the like, the DM Server informs finishing of the service to the external terminal.

Accordingly, the user can request the remote management service of the home appliance and notice a result of the request through the external terminal directly, without passing through the home appliance.

(3) Firmware Update

The Firmware Update is a service provided by a manufacturer for updating an error taken place in product development or a firmware improvement. The Firmware Update may be generated by an update package generator of the manufacturer, and the update package generated thus is transmitted to relevant products through the DM/DL clients.

The update package transmitted to the product thus may be stored at a reserved address of a designated flash memory, and, in this instance, a size of the update package may be limited by the manufacturer or the enterpriser.

FIG. 6 illustrates a diagram showing a service procedure for updating the firmware update package. The procedure will be described with reference to FIG. 6.

1. Generate Update Package: If a matter to change the firmware takes place, the manufacturer generates new firmware. An update package is generated, which has a difference between the new firmware and the firmware of the present version written thereon.

2. Register Update Package: The manufacturer register the Update Package generated thus to a system of the enterpriser.

3. Request for Test: The Update Package registered thus is subjected to a test procedure of the manufacturer before transmission to the home appliance.

4. Request for Distribution: The Update Package passed through the test is registered to the DL server for distribution to the home appliances.

5. Request for Notification: The DM Server request transmission of a notification message for carrying out registered work.

6. Transmission of the Notification Message: The notification message is transmitted to the home appliance.

7. Request for Downloading, and Installation of the Update Package: The home appliance having the Update Package downloaded thereon is re-started. (Depending on cases, the update may be made before the re-start).

8. Firmware Update: Update of the home appliance is carried out by using UA.

9. Notification of a Result of the Firmware Update: The home appliance notifies the DM server of a result of the Firmware Update.

The DM client of the home appliance is interrelated to the DM Server by using the OMA DM protocol, and the Firmware Update is made by the DM client and an FUMO Agent in interrelation to each other.

Starting main bodies of the firmware update procedure are the DM Server and the user, and a DM session mode can support both Background/Foreground.

In a case the DM Server starts the firmware update procedure, upon receiving a notification message from the DM Server, the DM client can start. In this instance, downloading and updating may be carried out at a time. That is, right after downloading the update package, update running (FUMO Node: DownloadAndUpdate) may be carried out through the UA.

In a case the user starts firmware update procedure, the user can input to carry out the update running (FUMO Node: DownloadAndUpdate) through a menu item on a display screen of the home appliance.

(4) Software Management

The software management is management work of addition, updating, and erasure of software. User software may be installed at a file system region (including internal/external memory) of the terminal.

FIG. 7 illustrates a diagram showing a procedure for software management by using which a Push type service is available. The procedure shown in FIG. 7 will be described.

1. Software Management Package Generation: A software manufacturer develops software and generates a management (Distribution) package in conformity with a relevant OS.

2. Management Package Registration: The software manufacturer registers the management package generated thus to the server.

3. Test Request: The management package generated thus is tested.

4. Distribution Request: Distribution of the management package having finished the test thus is requested.

5. Notification Request: The DM server request transmission of a notification message for carrying out registered work.

6. Notification Message Transmission: The notification message is transmitted to the terminal.

7. Request for Management Package Download and Installation: The DM Server makes management package download and installation request to the DM or DL client.

8. Management Package Work: Installation of the management package downloaded thus is requested to an Installer of a relevant OS at a desired option by an SCoMO Agent, and the relevant OS Installer installs/updates the management package at the user file system region.

9. Management Work Result Notification: The DM client at the terminal notifies the DM Server of a result of the management work.

The DM client at the terminal and the DM Server are interrelated to each other by the OMA DM protocol, and the DM client at the terminal manages the software in interrelation with the SCoMO Agent to each other.

A starting main body of the software management procedure may be the DM Server, and the DM session mode can support both Backgroun/Foregroun. By receiving a Notification Message from the DM Server, the terminal may make the DM client to start. In this instance too, both the download and the update may be carried out at a time. That is, right after downloading the management package file, the management work (SCoMO Node: DownloadInstallInactive or DownloadInstall) is made to be carried out through the SCoMO Agent.

(5) Home Appliance Control Management (Product Control)

A product can be controlled, remotely. The control management may be started by the DM Server, and may be operated in a Background. Therefore, interaction with the user through an MMI and occurrence of an interrupt may not be taken into account.

In a case of the refrigerator, a refrigerating chamber temperature, a freezing chamber temperature, a convertible room temperature or mode (Frozen food mode, Meat mode, Vegetable mode and so on), Express freezing (Including turning on/off), refrigerating chamber operation mode control (General mode, Test mode, LQC mode, display mode, smart diagnosis mode, and so on), and dispenser control (Fragmented ice mode, water mode, cubic ice mode, and so on) may be control items.

In a case of the washing machine, power turn on/off, putting into operation, operation turn off and so on may be control items. Along with this, a scheduled operation change, and a washing course detailed option change may also be the control items. Moreover, controlling the crumple preventive function to be carried out after finishing the washing course is also possible. Such control management may be made through the DM Server via the open API by using a smart phone application.

FIG. 8 illustrates a diagram showing a control management procedure, which will be described in detail.

1. Referring to control items/Request for Running: The manager (Or the user) requests work of the referring to control items/request for running to the ONM server by using a management frame on the ONM server.

2. Work Registration and Notification Request: The ONM server requests the control/operation work and notification of the same to the home appliance by means of a Notification message to the DM Server.

3. Notification Request: The DM Server requests the Notify server to notify a product.

4. Notification Message Transmission: The notify server transmits a notification message to the home appliance.

5. Carrying out Control Work: The home appliance receives the notification message from the DM Server, accesses to the DM Server, and carries out the control work.

The DM client at the home appliance interrelates to the DM Server by using the OMA DM protocol to each other, and the control is managed by the DM client at the home appliance and the control Agent in interrelation with each other.

A start main body of the control management may be the DM Server, and the DM session mode may be a Background. The DM Client starts the control management upon reception of the Notification Message from the DM Server.

(6) Diagnosis

The diagnosis is a service for diagnosing the home appliance. For an example, when it appears that the washing machine has a problem of having gone wrong, the user may request the diagnosis service. Upon reception of a diagnosis order, the washing machine puts a diagnosis program into operation to collect data required for the diagnosis.

The home appliance may collect event data or log data during normal operation. The data may be utilized as the diagnosis data. That is, collection of the diagnosis data can be made even if there is no diagnosis request. For an example, if an event takes place, in which the drum of the washing machine does not rotate, such an event data may be recorded and conserved. According to this, if there is the diagnosis request, the washing machine may drive the diagnosis program together with the data collected and recorded thus and may transmit a result of the drive to the server system, together with the collected data.

In a case of the washing machine, the diagnosis data may include a motor net acting ratio, a power data loaded on the washing machine, a tub or drum inside temperature data, a data on operation of a water supply valve, a data on operation of a drain valve, and so on.

And, in a case of the refrigerator, the diagnosis data may include a data on operation of a cooling fan, a refrigerating chamber or freezing chamber temperature data, a data on operation of a compressor, a data on operation of different valves, such as an expansion valve, a data on operation of an ice maker, and so on.

Along with this, the diagnosis data may include a data on operation of the display unit or the input unit which fall under the user interface, and a data on operation of a water level sensor (In a case of the washing machine), and different temperature sensors (For an example, a sensor for sensing a tub inside temperature of the washing machine, and a temperature sensor in the refrigerating chamber or the freezing chamber of the refrigerator).

The diagnosis data may include information on an order run time period, and a data produced time. The diagnosis data may be transmitted to the server, and the server may start an analysis program to provide a result of diagnosis.

The diagnosis request may be made through the smart phone, or access from the client center to the server system upon user's request to the client center. And, if an error takes place at the home appliance, as the error information is transmitted to the server, the diagnosis may be made.

The open API interface for the diagnosis may be designed to provide a start interface only. According to this, interruption after starting the diagnosis may not be provided.

FIG. 9 illustrates a diagram showing a procedure for the diagnosis, which will be described as follows. Since the diagnosis procedure may be the same with a monitoring procedure to be described later, the monitoring procedure is shown in FIG. 9, altogether.

1. Diagnosis/Monitoring Setting Request: The manager (Or the user) requests conditions and starting of running of the diagnosis/monitoring by using a management frame at the diagnosis server.

2. Work Registration and Notification Request: The management server requests the DM server to request the condition and the starting of running and requests notification of the same for making the diagnosis/monitoring.

3. Notification Request: The DM Server requests the Notify server to notify the terminal.

4. Notification Message Transmission: The Notify Server transmits the notification message to the terminal.

5. Diagnosis/Monitoring Setting: The DM Server requests the conditions and the starting of running for making diagnosis/monitoring to the DM client.

6. Diagnosis/Monitoring Result Notification/Referring to Data: Upon finishing the diagnosis/monitoring, the DM client (DiagMonAgent) at the terminal notifies (Alert message) the DM server of a result of the diagnosis/monitoring.

The starting main body of the diagnosis/monitoring management may be the DM server or the user, the DM session mode may be a Background.

If the DM server is the starting main body, the DM client starts the diagnosis/monitoring upon reception of the Notification Message from the DM server. And, if the user is the starting main body, the user starts the diagnosis/monitoring on the frame of the home appliance, and the home appliance runs the DM client after finishing the diagnosis/monitoring.

In the meantime, another mode of embodiment for carrying out the diagnosis will be described. The embodiment is related to user's transmission of operation sound or diagnosis sound to the server. For an example, the user may transmit the operation sound generated when the home appliance is in operation or the diagnosis sound for diagnosing the home appliance to the server system through the mobile communication terminal. The server system analyzes the operation sound or the diagnosis sound to diagnose the home appliance. The user may embody the transmission of the operation sound or the diagnosis sound to the server system in a variety of methods. For an example, when the user makes telephone call to the service center, and transmits the operation sound or the diagnosis sound of the home appliance through a receiver of the mobile communication terminal, the service center may transmit the operation sound or the diagnosis sound to the server.

The service center may be provided with an ARS system for automatic transmission of the operation sound or the diagnosis sound. The user may use a mobile communication terminal (For an example, the smart phone) having a diagnosis program installed thereto. That is, it may be possible to transmit the diagnosis sound to the server by using a diagnosis program installed to the mobile communication terminal. In this instance, the diagnosis sound may be transmitted to the server directly, or the user site may transmit the diagnosis sound to the server upon reception of the diagnosis sound from the user.

The server system may have a program for carrying out analysis and diagnosing the operation sound. The program may analyze the diagnosis sound data to convert the data into an error code or state information. The server system may transmit a result of such diagnosis to the mobile communication terminal of the user or the home appliance.

(7) Monitoring

Monitoring is a service related to monitoring of the home appliance. Upon reception of monitoring request, the home appliance may transmit a monitoring data to the server system.

For an example, upon requesting the washing machine for the monitoring data, the washing machine runs the monitoring program to collect the monitoring data, and transmits the same to the server. In this instance, the monitoring data may include information on a monitoring order run time period, and a monitoring data produced time period. And, it may be made that, if there is the monitoring run request, the monitoring data is transmitted repeatedly once the monitoring is started.

In a case of the refrigerator, whether the refrigerator is in the express freezing state or not, a Hygiene state (For an example, whether the hygiene state is turned on or off), a refrigerator operation mode, a dispenser state, an error state, a door open/closure state may be included to monitoring items. In a case of the washing machine, an operation state, a remaining time period of a course under operation, an initial set time period, a kind of washing course, a rinsing level, a spinning RPM, a set temperature for carrying out the course, and a scheduled operation time period may be included to the monitoring items.

The monitoring service may be requested through the smart phone, and referring to a result of the request may be possible.

The open API interface for monitoring may be designed to provide both starting and finishing interfaces.

The monitoring procedure may be as shown in FIG. 9.

Thus, an embodiment of a home appliance and an online system including the same which can embody the present invention have been described with reference to FIGS. 2 to 9.

A home appliance communication connection method and a configuration for this will be described with reference to FIGS. 1 and 10, in detail.

The home appliance 20 is required to communicate with the server 10, ultimately. For this, the home appliance 20 is required to communicate with an AP 30 in a home at first. Therefore, the home appliance 20 is required to have the communication module mounted or connected thereto. In detail, the communication module may be a WiFi communication module 25.

At first, power is applied to the home appliance 20 through a power selection unit 140 at the control panel 100 of the home appliance 20. In this instance, the power is applied to the WiFi communication module 25, too.

Referring to FIG. 10, the control panel 10 may have the state indicating unit 130 provided thereto. In the meantime, the state indicating unit 130 may be a touch display. The touch display indicates all states of the home appliance, and by touching the display, most of operation and conditions can be selected as well as can input characters and numerals. In this instance, by displaying a key pad on the touch display, the user can make such input to the key pad.

According to this, entire input means and display means may be omitted from the control panel 100 except the power button 140 which applies power to the home appliance and the touch display 130.

Owing to such functions of the touch display, the user can make the communication connection of the home appliance to the server, easily.

FIG. 11 illustrates a diagram showing a touch display of the laundry machine as an embodiment of such a touch display 130, particularly an initial frame.

The touch display 130 includes a main frame region 210, an indicator region 220, and a button region 230, partitioned from one another.

Basically, the main region may display basic courses provided in default. Along with this, the main region may display a user set course, and an updated course. If there are many courses, an arrow mark may be displayed on both sides of the main region. By touching the arrow mark 211, the user may notice the courses, in succession.

As an example, FIG. 11 illustrates 6 default courses. In this instance, it is preferable whether the courses displayed thus are default courses or not. Therefore, it is preferable that the courses are displayed on a particular portion, for an example, upper side. That is, it is preferable that, by displaying "Basically provided courses" or "Default courses" on the upper side of the main region, the user may be able to notice that the courses displayed presently are what kinds of courses.

And, it is preferable that, if the course display is noticed in left/right directions in succession, an indication of order is displayed for indicating the courses displayed presently are courses of which portion. For an example, FIG. 11 illustrates six circular icons 212. It may be said that one icon is matched to one washing course or a drying course. By selecting the icon, a course selection can be made. A color of a particular icon may be displayed different from other icons, enabling the user to notice that the course is which part of courses. For an example, by making a color of the default courses different from a color of user courses, the user can make characteristics of the courses distinctive, easily. And, the user can make such courses distinctive from the updated courses.

Basically, the default courses are made to be displayed on a left side, and the user designated courses and the updated courses may be displayed as the frame goes to the right side the more. According to this, it may be made such that the color of the circular icon positioned further right is changed if the right side arrow mark is pressed. By displaying that the courses are custom cycle or custom course on the upper side of the main region if the user designated courses are displayed, the touch display may be made to indicate that the user courses are displayed, presently.

In the meantime, the user may notice presently updated courses among the user courses. Moreover, the user may also verify the updated courses with icon marks and course names.

The indicator region 220 may be provided to display at least one of WiFi connection indication, smart grid use indication, and Zigbee connection indication. The Zigbee may be a communication module provided to connect to a power company to receive power information. FIG. 11 illustrates the indicator region 220 indicating states of WiFi connection, smart grid use, and a Zigbee connection.

The button region 230 may display different input means 231, 232, 233, 234, and 235. By touching the input means, a desired function can be embodied. For an example, the button region 230 may display at least one of the input means "THINQ" 231 for requesting service in relation to the server, input means "Recent Cycle" 232 for verifying course information used many times recently, input means "Guide" 233 for providing user manual, input means "Set Up" 234 for setting different environments of the laundry machine, and input means "Child Lock" 235 for inactivating all input means except a power button. Detail of the display may vary and input means other than above input means may be displayed, as necessary.

In this instance, by selecting the input means "THINQ" 231, the course update is possible, which will be described later. That is, by touching the input means 231, the user can apply remote management service to the server. In other words, by selecting or touching the input means provided to the display or the touch display 130, the user can apply the remove management service to the server, personally.

For an example, by selecting the input means 231, the user can request the remote diagnosis, the remote control, and the firmware or software update to the server. Of course, such remote management service is no more than an example, and can be extended further. The remote management service can be requested on the assumption that the laundry machine is communication connected to the server.

In order to make such communication connection easy, the "Set Up" input means 234 may be provided. That is, the user may connect the home appliance to the server through the input means 234.

By selecting the input means 234, WiFi setting or product registration is possible, and for this, the main region 230 may be changed to a frame shown in FIG. 12. Of course, separate from the frame shown in FIG. 11, a frame shown in FIG. 12 may be displayed in a form of a popup window.

Through the frame shown in FIG. 12, SSID (Service Set Identifier, a name of a wireless LAN) information on an accesser point AP 30 and user information for registration of the home appliance is received.

Upon pressing searching/setting of the user AP, SSIDs accessible from the main region can be displayed, and the user selects an SSID which is to be kept connected, for an example, an SSID used in a home. In this instance, if security is set to the wireless LAN, the external terminal is required to input both the SSID selection and a password thereof altogether. Therefore, the SSID information may include a SSID password.

Therefore, by displaying the SSID selected thus on the user AP window, and inputting the user ID and password registered to the server or the user site, the home appliance can be registered to the server. That is, by receiving the user information and the SSID information, the home appliance can be communication connected to the server through the WiFi communication module.

In this instance, it is preferable that, when the SSID information and the user information are received, the information is stored in the communication module automatically, to make automatic and continuous communication possible without separate WiFi setting. That is, with the information, the WiFi communication module can access to the AP, automatically. Therefore, the home appliance 20 can make wireless LAN communication to a particular AP 30. That is, short range communication is made possible.

In the meantime, the communication module has an address of the server 10 the communication module intends to access. In this instance, it is preferable that the server address is a fixed IP. Therefore, the home appliance 20 is made to communicate with the server 10 through the AP 30. In this instance, the user information and the product information stored in the home appliance already are registered to the server 10 through the AP, automatically.

In this instance, the user information may be information stored in the server 10 through the user site described before. According to this, the server 10 compares the user information and the product information stored therein already through the user site 60 to information received from the laundry machine, and stores the same. With this, the server 10 perceives the particular user and the particular home appliance thereof. Especially, the server 10 can perceive a position of the particular home appliance.

As the laundry machine is WiFi connected to the AP with above steps, the laundry machine can communicate with the server. Upon finishing such connection, a WiFi connection mark is displayed at the indicator region 220 shown in FIG. 11 for the first time.

Then, it is preferable that the WiFi connection is performed automatically as power is applied to the laundry machine. Of course, the WiFi connection may be kept regardless of the power to the laundry machine. However, different from the refrigerator and so on, the laundry machine is a product that does not required continuous connection of the power. Therefore, it is more preferable that the WiFi connection of the laundry machine is performed after the power is applied to the laundry machine, automatically.

If the home appliance is registered to the server, as described before, the home appliance can request the remote management server to the server, directly. And, as described later, the user can request the remote management of the home appliance to the server through the external terminal 40.

The external terminal 40 may have an application provided thereto for requesting and performing at least one of remote control, remote diagnosis, firmware or software update, and monitoring of the home appliance 20.

At the time of an initial performance of the application, the user information is transmitted to the server, and the server can communicate with the home appliances of the user to perform the service requested thus. In the meantime, the application may have serviceable products indicated thereon, and may be provided to select one of the products the user owns, actually. If the user's product is not registered to the server, the server may guide a product registration method through the application.

Requesting and performing the remote management service, particularly, the course update, through the application will be described, in detail.

At first, if the external terminal runs the application, a frame shown in FIG. 13 may be displayed. The user can request different management services to the server through the frame.

FIG. 13 illustrates a diagram showing Smart Diagnosis, Smart Access (Remote control), Smart Adapt (Course update) and Laundry Guide menus as an example. It is preferable that one of the menus is included, and other menus may also be included.

If the user presses the Smart Adapt, a frame is displayed for log in the server, as shown in FIG. 14, as an example. The user selects a country (Server selection, "Current residence") with this frame, and accesses to the server by inputting the user ID and password. Of course, the log in frame may be displayed only in the initial log in, and may log in automatically, thereafter. However, since other person may run the application freely, it is preferable that the application is logged in upon reception of at least the user password every time the application is run.

Upon pressing the log-in menu, the server determines whether the user is registered or not. If not, the external terminal may display the user site to request user's registration, or may connect to the user site, directly. Of course, a user site mark ("us.smartting.com") may also be displayed on the log-in frame.

By pressing the user site address mark, the user can access to the user site, and may have the user ID and the password given thereto. With above steps, the user may register to the server. The user site may have addresses different with servers. For an example, for every country and every language used, the server addresses may different from one another.

If the server has the user registered thereto, the server will know whether the user's home appliances are registered or not. Therefore, the external terminal will display the home appliances registered thus if any. If the registered home appliances are plural, the user may select a particular one of the home appliances for having service provided thereto. Then, the user may request the management service for the particular product through the application.

In the meantime, if the user's home appliance is not registered to the server, the server indicates that the user's home appliances are not registered through the popup window or the like. Accordingly, the user can understand a home appliance registration method through the external terminal for registration of the home appliances to the server, easily.

In detail, the user may select "How to register" shown in FIG. 14 or 15 on the external terminal 40 to register the product to the server.

FIG. 15 illustrates a diagram showing a frame of an external terminal displayed if a user's product is not registered. Accordingly, by pressing the "How to register", the user may be guided on "How to register" a product to the server. As described before, the method may be embodied by pressing the "Set up" input means at the touch display 130.

In this instance, it is preferable that the registration of the home appliance to the server is made, through the home appliance directly, but not through the external terminal 40. This is because, though the user can be specified with the user ID or the like, it is liable that an error may take place in specifying the home appliance.

As described before, though the home appliance may be specified with the device ID or the like, the user is liable to register the home appliance wrongly through the external terminal even if the user knows the device ID. That is, the user is liable to specify, not his (her) home appliance, but other's home appliance. Therefore, it is preferable that the device ID is, not information the user inputs through the input means, but information to be transmitted/received among the home appliance, the server, and the external terminal through communication only.

The application may be one for a particular product group, for an example, the laundry machine, or a particular product, for an example, a washing machine. Therefore, user's running of the application implies user's desire of service for the particular product group or the particular product. Therefore, the user's running of the application implies that the user inputs the user information on the particular product group or the particular product to log in the server. Therefore, after log in, the server determines whether the home appliance is registered to the server together with the user information.

If the description is made easy, the course updating implies updating the washing machine with a new course through the external terminal, such as the application at the smart phone Alike the default courses, the user may select the updated course and run the updated course at the laundry machine. In order to make this easy, the server is provided between the smart phone and the washing machine.

As described with reference to FIGS. 13 and 14, the user may transmit the user information to the server to log in the server through the external terminal. If the application is for service of the particular product, for an example, the course update of the laundry machine, in the step of log in, the user information will be received at the server.

If the application is for service of many products, only the user information will be received at the server in the step of log in. As the user selects a particular product after the step of log in, information on the particular product will be received at the server. Eventually, if a service objective product is selected after finishing log in, or after log in, the user can request remote management service of the objective product. This is because the server can specify the home appliance of the user registered to the server with the user information.

FIG. 16 illustrates a diagram showing an example in which the washing machine and the dryer are displayed on the external terminal in a case the washing machine and the dryer are registered to the server. Accordingly, the user may select a product from the displayed products you desire the course update. If only one product is registered, the user may select only the product.

If any one of the washing machine and the dryer is selected, the server can specify the product selected thus is whose, and connected to which AP.

In detail, the user may select a laundry machine of which course update is desired, and request the service to the server through the external terminal. The server receives such request, and transmits information on an updatable course provided to be applicable to the product with reference to the user information and the product information to the external terminal. The external terminal receives the updatable course information from the server and displays the same on the external terminal.

FIG. 17 illustrates a diagram showing an example in which the updatable courses are displayed on the external terminal.

The user may select one particular course from at least one updatable course through the external terminal. If the user selects the particular course, the external terminal transmits selected course information to the server.

The server receives the particular course update request through the external terminal and updates a course of the laundry machine by communication with the laundry machine.

In the meantime, the server may determine whether the laundry machine has an updated course presently or not. This is because the course update is performed through the server, the server has such an update history stored therein. That is, this is because the server has information on update request through the laundry machine or the external terminal, update completion, and updated detail.

Therefore, it is preferable that the server transmits existing updated course information, and newly updatable information, with the existing updated course information made distinctive from the newly updatable information. With this, it is preferable that the external terminal displays the existing updated course information, and the newly updatable information, with the existing updated course information made distinctive from the newly updatable information.

FIG. 17 illustrates a diagram showing an example the laundry machine has the existing updated course, and FIG. 18 illustrates a diagram showing an example after a new course is updated.

For an example, of the courses shown in FIG. 17, an uppermost course may indicate the existing update course. That is, this course is indicated as an updated course used presently. And, newly updatable courses are displayed made distinctive from one another. FIG. 17 illustrates 6 newly updatable courses. The newly updatable courses may be noticed with scroll and selected.

For an example, the user may select a particular course ("Bag tangled2) shown in FIG. 17. The external terminal may transmit information selected thus to the server, and the server may update the course selected thus to the laundry machine. And, if the updating is finished, update finishing information is transmitted from the laundry machine to the server. And, the server also transmits the update finishing information to the external terminal.

Upon finishing the updating, as shown in FIG. 18, the external terminal may display an update finished course as a presently using course. That is, if the course ("Bag tangled2") displayed at a third position from a top in FIG. 17 is selected and updated, the updated course is displayed as the presently using course after finishing the updating.

In this instance, characteristics of the update courses may be indicated with forms of icons. And, newly updatable courses may be informed to the user each with an indication of a New that the courses are newly provided courses. Of course, brief characteristic or description of the courses may be displayed.

In the meantime, if the user selects the new course and finishes update at the frame shown in FIG. 18, the presently using course is replaced with the newly updated courses. And, an erased course may be displayed as an updatable course, again. Of course, in this case, not only the external terminal, but also the update course displayed at the main region 210 of the display of the laundry machine is also replaced.

In other words, the laundry machine may have only one course menu allocated thereto for updating a course. Of course, in order to update a plurality of courses, the laundry machine may have a plurality of course menus allocated thereto. However, the updating course may be, not a general course, but a course set to be used in a specific purpose or a very special situation. And, such courses may be upgraded consistently. And, by adding a numeral to the course to indicate whether the course is upgraded or not, an upgrade history may be made to be displayed. According to this, the user may select an optimal update course provided presently as necessary, and use this for the laundry machine.

In the meantime, the user can update the course of the home appliance, particularly, the laundry machine, through the external terminal, easily and conveniently. Of course, communication data quantity between the external terminal and the server is not substantial. This is because data on basic information, such as desired service information, user information, product information, the present state of the laundry machine, and so on will be transmitted and received. Therefore, even at a place a communication environment is comparatively poor, the user can update the home appliance through the external terminal, easily.

Opposite to this, data for course updating is transmitted between the laundry machine and the server. The laundry machine can be communication connected to the server through the AP in the home, securely. Accordingly, even if a comparatively large quantity of data can be transmitted between the laundry machine and the server.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

Described in the detailed description of the present invention.

The invention claimed is:

1. A method for using an online system comprising:
log in a server by transmitting user information to the server through an external terminal;
selecting a laundry machine of which remote course updating is desired through the external terminal and based on the selected laundry machine, transmitting laundry machine information to the server;
transmitting, from the server and to the external terminal, updatable course information which is provided to be applicable to the laundry machine with reference to the user information and the laundry machine information;
receiving, at the remote terminal, updatable course information from the server, and displaying, on the external terminal, the received updatable course information;
selecting, at the external terminal, an updating desired course, and transmitting selected course information to the server; and
the server updating the laundry machine with the selected course through the server by communication with the laundry machine after determination of the laundry machine matching to the user information and the laundry machine information,
wherein the laundry machine has a WiFi communication module mounted thereto, with a server address for communication with the server, and a touch display for displaying input means for connecting the WiFi communication module to the server to communicate with the server.

2. The method as claimed in claim 1, wherein the updatable course information includes existing updated course information and newly updatable course information.

3. The method as claimed in claim 2, wherein the server transmits, to the external terminal, existing updated course information and newly updatable course information of the laundry machine, with the existing updated course information made distinctive from the newly updatable course information.

4. The method as claimed in claim 3, wherein the external terminal simultaneously displays the existing updated course information and the newly updatable course information, with the existing updated course information being displayed to be distinctive from the newly updatable course information.

5. The method as claimed in claim 4, wherein, when the external terminal selects the newly updatable course from the simultaneously displayed existing updated course information and the newly updatable course information, the existing updated course is replaced with the selected new course to update the existing updated course of the laundry machine.

6. The method as claimed in claim 1, wherein the user information includes user ID and password registered to the server.

7. The method as claimed in claim 1, wherein the server is plural, and the user can select a server the user is to access through the external terminal.

8. The method as claimed in claim 1, further including the server determining whether the laundry machine of the user is registered or not after log in, and transmitting, to the external terminal, a result of the determination to the external terminal.

9. The method as claimed in claim 8, wherein the external terminal indicates the user to be able to select a registered laundry machine, if any.

10. The method as claimed in claim 8, wherein the external terminal indicates a method for registering the laundry machine to the server when there is no registered laundry machine.

11. The method as claimed in claim 1, wherein SSID information on an AP and the user information are inputted to the touch display, for the WiFi communication module to communicate with the server through the AP, and to register the laundry machine information and the user information to the server, altogether.

12. A method for using an online system, comprising:
registering a user to a server by using user information inputted to a user site;
inputting the user information to an external terminal provided to enable to update a course of a laundry machine to log in the server;
determining whether the laundry machine of the user is registered to the server or not after log in, and transmitting a result of the determination to the external terminal;
the external terminal indicating a registered laundry machine for enabling the user to select, and indicating a method for registering the laundry machine to the server when there is no registered laundry machine;
when a laundry machine, in which course update is desired, is selected through the external terminal, transmitting, from the external terminal, information on the selected laundry machine to the server;
transmitting, from the server and to the external terminal, updatable course information which is provided to be applicable to the laundry machine with reference to the user information and the laundry machine information;
receiving the updatable course information from the server, and displaying, on the external terminal, the updatable course information;
selecting, at the eternal terminal, an update desired course, and transmitting the selected course information to the server; and
the server updating the laundry machine with the selected course by communication with the laundry machine after determination of the laundry machine matching to the user information and the laundry machine information
wherein the laundry machine has a WiFi communication module mounted thereto, with a server address for communication with the server, and a touch display for displaying input means for connecting the WiFi communication module to the server to communicate with the server.

13. The method as claimed in claim 12, wherein the server transmits, to the external terminal, existing updated course information and newly updatable course information of the laundry machine, with the existing updated course information made distinctive from the newly updatable course information.

14. The method as claimed in claim 13, wherein, when the newly updatable course is updated, the external terminal replaces an existing updated course with the newly updatable course.

15. The method as claimed in claim 13, wherein, when the external terminal selects a newly updatable course, the existing updated course is replaced with the selected new course to update the existing updated course of the laundry machine.

16. The method as claimed in claim 12, wherein the laundry machine includes the touch display that displays default courses, user generated courses, and updated courses for enabling the user to select.

17. The method as claimed in claim 16, wherein, when the external terminal selects a new updatable course and finishes updating the new updatable course, the touch display of the laundry machine displays the selected new course replacing the existing updated course.

18. A non-transitory recording medium having the method for using an online system as claimed in one of claims 1 to 10, 12, or 13 stored therein.

19. The method as claimed in claim 1, wherein the touch display is provided to receive user AP information to be communicated connected to and the user information registered to a user site,
wherein the Wifi communication module transmits the user information and the user AP information inputted to the touch display to the user side or the server to register the laundry machine to the server, and
wherein the WiFi communication module maintains communication connection to the server for having remote management service requested by the laundry machine through the external terminal communication connected to the server after the registration.

20. The method as claimed in claim 12, wherein the laundry machine comprises:
a main controller;
the display provided to receive user AP information to be communication connected to and the user information registered to the user site; and
the WiFi communication module for transmitting the user information and the user AP information inputted to the display to the user site or the server to register the laundry machine to the server, and maintaining communication connection to the server for having remote management service requested by the laundry machine through the external terminal communication connected to the server after the registration.

21. The method as claimed in claim 1, wherein the online system comprises:
the server for providing remote management service;
a user site for registering the user by inputting the user information thereto, and transmitting the user information to the server, to register the user to the server,
the laundry machine having a unique device ID for transmitting the user information registered to the user site and the device ID to the user site or the server to register the laundry machine to the server, and communication connected to the server through WiFi communication connection to an AP for receiving remote management service through the server; and
the external terminal having an application mounted thereto which is communication connected to the server, for transmitting the user information and the laundry machine information desired to have remote management service provided thereto to the server, and requesting the remote management service of the laundry machine to the server on behalf of the laundry machine.

22. The method as claimed in claim 12, wherein the online system comprises:
the server for providing remote management service;
the user site for registering the user by inputting the user information thereto, and transmitting the user information to the server, to register the user to the server;
the laundry machine having a unique device ID for transmitting the user information registered to the user site and the device ID to the user site or the server to register the laundry machine to the server, and communication connected to the server through WiFi communication connection to an AP for receiving remote management service through the server, and
the external terminal having an application mounted thereto which is communication connected to the server, for transmitting the user information and the laundry machine information desired to have remote management service provided thereto to the server, and requesting the remote management service of the laundry machine to the server on behalf of the laundry machine.

* * * * *